(12) United States Patent
Itoh

(10) Patent No.: US 6,348,997 B1
(45) Date of Patent: Feb. 19, 2002

(54) POLARIZING ILLUMINATING DEVICE AND PROJECTOR

(75) Inventor: Yoshitaka Itoh, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/512,892

(22) Filed: Feb. 25, 2000

Related U.S. Application Data

(63) Continuation-in-part of application No. 09/051,633, filed as application No. PCT/JP97/02874 on Aug. 20, 1997, now Pat. No. 6,108,132.

(30) Foreign Application Priority Data

Aug. 20, 1996 (JP) .............................................. 8-238464

(51) Int. Cl.⁷ ................................................ G02B 5/30
(52) U.S. Cl. ...................... 359/487; 359/495; 359/634; 353/20; 349/9
(58) Field of Search ................................ 359/247, 250, 359/256, 483, 485, 487, 494, 495, 496, 497, 629, 634, 638; 353/20, 8, 31, 33, 37; 349/9, 8, 68

(56) References Cited

U.S. PATENT DOCUMENTS

| | | | |
|---|---|---|---|
| 5,295,018 A | | 3/1994 | Konuma et al. |
| 5,485,310 A | | 1/1996 | Inada |
| 6,042,234 A | * | 3/2000 | Itoh ............................ 353/20 |
| 6,108,132 A | * | 8/2000 | Itoh ............................ 359/487 |
| 6,132,047 A | * | 10/2000 | Itoh ............................ 353/20 |

FOREIGN PATENT DOCUMENTS

| | | |
|---|---|---|
| JP | 3-191318 | 8/1991 |
| JP | 5-27201 | 2/1993 |
| JP | 5-34638 | 2/1993 |
| JP | 6-202041 | 7/1994 |
| JP | 6-208080 | 7/1994 |
| JP | 7-244282 | 9/1995 |
| WO | WO96/20422 | 7/1996 |

OTHER PUBLICATIONS

Patent Abstracts Of Japan, "Lighting Device and Projection Display Device Using it", JP–A–08–211329, Aug. 20, 1996.

Patent Abstracts Of Japan, "Polarizing Illuminator and Projection Type Display Device Using the Same", JP–A–08–220475, Aug. 30, 1996.

* cited by examiner

*Primary Examiner*—Cassandra Spyrou
*Assistant Examiner*—Euncha Cherry
(74) *Attorney, Agent, or Firm*—Oliff & Berridge, PLC

(57) ABSTRACT

The invention provides a polarizing illumination device in which randomly polarized light beams emitted from first and second light source sections, respectively, are directionally separated into two types of polarized light beams by a polarization separating optical element to form three types of polarization light beams whose directions of polarization mutually intersect perpendicularly, and then, one of the polarized light beam is returned to the light source sections to rotate the direction of polarization, other two types of polarized light beams are condensed at spatially different positions, and the directions of polarization of the polarized light beams are unified. Therefore, a polarizing illumination device that is able to utilize both polarized light components by using a plurality of light sources without increasing the illumination angle can be provided, and a projector that is able to project an extremely bright projection image can also be provided.

44 Claims, 15 Drawing Sheets

POLARIZING ILLUMINATING DEVICE AND PROJECTOR

This is a Continuation-in-Part of Application Ser. No. 09/051,633 filed Apr. 16, 1998, U.S. Pat. No. 6,108,132. The entire disclosure of the prior application(s) is hereby incorporated by reference herein in its entirety which is a 371 of PCT/JP97/02874 filed Aug. 20, 1997.

BACKGROUND OF THE INVENTION

1. Field of the Invention

The present invention relates to a polarizing illumination device for uniformly illuminating a rectangular illumination area and the like by using polarized light beams polarized in the same direction, and to a projector using the polarizing illumination device. More particularly, the present invention relates to a structural technique for synthesizing light emitted from two light source sections while unifying the directions of polarization of the light.

2. Description of Related Art

A liquid crystal display device using a modulation device of a type that modulates a specific polarized light beam, such as a liquid crystal device, can utilize only one of two types of polarized light components included in light emitted from a light source. Therefore, there is a need to enhance light utilization efficiency in order to obtain a bright projection image. However, since a projector using only one light source has a limited ability to enhance light utilization efficiency, the amount of light has been increased by using a plurality of light sources as a way of obtaining a bright image.

However, when simply a plurality of light sources are arranged, the angle distribution of light for illuminating an illumination area is increased (the illumination angle is increased). Therefore, the amount of light in a given illumination angle is the same as that in the case where only one single light source is used. Consequently, in a projector in which the illumination angle is controlled by a projection system, the amount of light is not practically increased even when a plurality of light sources are used.

In addition, even if the amount of light is increased by using a plurality of light sources, when only one of two types of polarized light components, which are included in light emitted from the light sources, can be used, and half the light is wasted, which reduces the effectiveness by half.

SUMMARY OF THE INVENTION

It is an object of the present invention to provide a polarizing illumination device that is able to utilize both polarized light components by using a plurality of light sources, without increasing the illumination angle, and to provide a projector that is able to project a considerably bright projection image.

In order to achieve the above object, according to the present invention, there is provided a polarizing illumination device including:

a polarization separating optical element having a first polarization separating film for separating light incident from a first direction into two types of polarized light beams, emitting transmitted light in a third direction, and emitting reflected light in a fourth direction, and a second polarization separation film for separating light incident from a second direction into two types of polarized light beams, emitting reflected light in the fourth direction, and emitting transmitted light in a fifth direction;

a first light source section for allowing light to enter the polarization separating optical element from the first direction;

a second light source section for allowing light to enter the polarization separating optical element from the second direction;

a first condensing-and-reflecting optical element including a plurality of condensing-and-reflecting devices for approximately reversing the direction of travel of the light emitted in the third direction by the polarization separating optical element and forming a plurality of focal images;

a second condensing-and-reflecting optical element including a plurality of condensing-and-reflecting devices for approximately reversing the direction of travel of the light emitted in the fifth direction by the polarization separating optical element and forming a plurality of focal images;

a reflecting optical element for approximately reversing the direction of travel of the light emitted in the fourth direction by the polarization separating optical element;

a first polarization-state conversion optical element disposed between the polarization separating optical element and the first condensing-and-reflecting optical element;

a second polarization-state conversion optical element disposed between the polarization separating optical element and the second condensing-and-reflecting optical element;

a third polarization-state conversion optical element disposed between the polarization separating optical element and the reflecting optical element; and a polarization conversion optical element for unifying the direction of polarization of the light emitted in a sixth direction from the polarization separating optical element;

wherein an approximately central axis of a luminous flux, which is reflected by the condensing-and-reflecting devices of the first condensing-and-reflecting optical element and enters the polarization conversion optical element, and an approximately central axis of a luminous flux, which is reflected by the condensing-and-reflecting devices of the second condensing-and-reflecting optical element and enters the polarization conversion optical element, are not parallel to each other, and do not overlap.

In the polarizing illumination device of the present invention, a randomly polarized light beam emitted from the first optical source section is allowed to enter from the first direction of the polarization separating optical element, and is separated into two types of polarized light beams by the first polarization separating film. On the other hand, a randomly polarized light beam emitted from the second light source section is allowed to enter from the second direction of the polarization separating optical element, and is separated into two types of polarized light beams by the second polarization separating film.

Of the thus-separated polarized light beams, the transmitted light, which is emitted in the third direction by the first polarization separating film, passes through the first polarization-state conversion optical element, is reflected by the first condensing-and-reflecting optical element, passes through the first polarization-state conversion optical element again, and travels toward the polarization separating optical element. In this case, this light is separated into a plurality of intermediate luminous fluxes by the first condensing-and-reflecting optical element, and passes through the first polarization-state conversion optical element two times, whereby it is converted into a polarized light beam whose direction of polarization is rotated about 90 degrees. Therefore, this light is reflected by the first polarization separating film, and is emitted in the sixth direction. The polarized light beam emitted in the sixth direction in this way is designated as a first polarized luminous flux.

In addition, the transmitted light, which is emitted in the fifth direction by the second polarization separating film, passes through the second polarization-state conversion optical element, is reflected by the second condensing-and-reflecting optical element, passes through the second polarization-state conversion optical element again, and travels toward the polarization separating optical element. In this case, this light is separated into a plurality of intermediate luminous fluxes by the second condensing-and-reflecting optical element, and passes through the second polarization-state conversion optical element two times, whereby it is converted into a polarized light beam whose direction of polarization is rotated about 90 degrees. Therefore, this light is reflected by the second polarization separating film, and is emitted in the sixth direction. The polarized light beam emitted in the sixth direction in this way is designated as a second polarized luminous flux.

The first and second polarized luminous fluxes each including a plurality of intermediate luminous fluxes form a plurality of focal images on the polarization conversion optical element or in the vicinity thereof. Here, approximately central axes of the first and second polarized luminous fluxes are not parallel to each other, and do not overlap. Therefore, the focal images of the first polarized luminous flux and the focal images of the second polarized luminous flux are formed at positions different from each other. Therefore, the direction of polarization of the first polarized luminous flux and the direction of polarization of the second polarized luminous flux can be unified by the polarization conversion optical element.

On the other hand, the reflected light, which is emitted in the fourth direction by the first polarization separating film and the second polarization separating film, passes through the third polarization-state conversion optical element, is reflected by the third reflecting optical element, passes through the third polarization-state conversion optical element again, and travels toward the polarization separating optical element. In this case, this light passes through the third polarization-state conversion optical element two times, whereby it is converted into a polarized light beam whose direction of polarization is rotated about 90 degrees. Therefore, the light, which is emitted from the first light source section, reflected by the first polarization separating film, and returned to the polarization separating optical element via the third polarization-state conversion optical element and the third reflecting optical element, is reflected by the second polarization separating film, and travels toward the second light source section. In addition, the light, which is emitted from the second light source section, reflected by the second polarization separating film, and returned to the polarization separating optical element via the third polarization-state conversion optical element and the third reflecting optical element, is reflected by the first polarization separating film, and travels toward the first light source section. That is, these light enter the light source sections that are different from those at the time of emission while changing the directions of polarization. Here, a light source section of a projector generally includes a light source lamp and a reflector. Therefore, a polarized light beam, which enters the light source section, is reflected by the reflector of the light source section, is subjected to a rotation action of the polarization axis at that time, and a part of the polarized light beam is converted into a polarized light beam that can pass through a first or a second polarization separating film. In this way, the polarized light beam that can pass through the first or the second polarization separating film, similarly to the above-described polarized light beams emitted in the third and fifth directions, is converted into the first polarized luminous flux or the second polarized luminous flux to enter the polarization conversion optical element, and polarization axes are united. In short, the polarized light beams, which returned to the first and second light source sections from the polarization separating optical element, are finally converted into one type of polarized light beam to be emitted from the polarization conversion optical element.

Therefore, although the two light source sections are used, an area to be illuminated can be equalized to an area to be illuminated by almost one light source section without increasing an incident angle (illumination angle) of illumination light with respect to the illumination area. For this reason, since the amount of light per given illumination angle can be made double that in the case where a single light source section is used, it is possible to illuminate the illumination area very brightly. In addition, since the intermediate luminous fluxes formed by the respective condensing-and-reflecting optical elements are superposed on one illumination area, it is possible to illuminate uniformly the illumination area. Therefore, if the polarizing illumination device of the present invention is used as a light source of a display device, a projection image having extremely uniform brightness can be obtained. Furthermore, according to the polarizing illumination device of the present invention, the randomly polarized light beams emitted from the first and second light source sections can be synthesized into one type of polarized light beam without causing any loss. Therefore, if the polarizing illumination device of the present invention is adopted in a display device using a modulation device of a type that modulates a specific polarized light beam, such as a liquid crystal device, it is possible to obtain an extremely bright projection image.

The positions where the first and second condensing-and-reflecting optical elements are disposed, in this nature, are not clearly defined. In short, the first and second condensing-and-reflecting optical elements may be disposed so that focal images of two polarized light beams included in emitted light of the first and second light source sections (the polarized light beam emitted from the first light source section to pass through the first polarization separating film, and the polarized light beam emitted from the second light source section to pass through the second polarization separating film) are formed at positions spatially separated from each other.

In the present invention, the reflecting optical element may preferably be disposed so that the polarized light beam emitted from the first light source section and reflected by the first polarization separating film, and the polarized light beam emitted from the second light source section and reflected by the second polarization separating film enter the second and first light source sections that are different from those at the time of emission. In particular, when an optical axis of the first light source section and an optical axis of the second light source section perpendicularly intersect, and the polarization separating optical element is a rectangular prism, the reflecting optical element may preferably be disposed to be nearly parallel to a surface of the polarization separating optical element corresponding to the "fourth direction". As a result, the polarized light beam emitted from the first light source section and reflected by the second polarization separating film via the first polarization separating film and the reflecting optical element, and the polarized light beam emitted from the second light source section and reflected by the first polarization separating film via the second polarization separating film and the reflecting optical element can be efficiently allowed to enter the corresponding second and first light source sections, respectively, the utilization efficiency of the polarized light beam can be improved, and the illumination area can be brightly illuminated. Incidentally, the third polarization-state conversion optical element disposed between the polarization separating optical element and the reflecting optical element can be omitted. In this case, both of the polarized light beams reflected by the reflecting optical element and returned to the polarization separating optical element return to their original light source sections from which they are emitted. Since the polarization axes of these polarized light beams are rotated while they are reflected by the reflectors of the light source sections to become polarized light to reach the polarization conversion optical element, these polarized light beams are finally converted into one type of polarized light beam without causing light loss.

In the present invention, an opening shape of each of the condensing-and-reflecting devices can be made similar to the shape of an illumination area. Since light from the light source sections is divided by the condensing-and-reflecting optical elements into a plurality of intermediate luminous fluxes, and finally superposed on the illumination area, the adoption of the above construction can guide the light from the light source sections to the illumination area most efficiently.

In the present invention, a condensing optical element including a plurality of condensing devices is disposed on the side of the incident surface or on the side of the emitting surface of the polarization conversion optical element, in order to condense light emitted from the polarization separating optical element. The disposition of the condensing optical element in this way makes it possible to guide effectively the plurality of intermediate luminous fluxes formed by the condensing-and-reflecting optical elements to predetermined positions of the polarization conversion element while condensing the luminous fluxes. Therefore, an advantage is provided that the polarization conversion efficiency can be increased. When the first and second condensing-and-reflecting optical elements are composed of different numbers of condensing-and-reflecting devices, the condensing optical element may be composed of at least as many condensing devices, or twice as many condensing devices as the number of condensing-and-reflecting devices that constitute the condensing-and-reflecting optical element having the largest number of condensing-and-reflecting devices. However, if the light utilization efficiency of the condensing optical element is regarded as important, the latter construction may preferably be adopted.

In the present invention, a superimposing optical element for superimposing light emitted from the polarization conversion optical element on the illumination area can be disposed on the side of the emitting surface of the polarization conversion optical element. The disposition of the superimposing optical element in this way makes it possible to guide effectively the plurality of intermediate luminous fluxes formed by the condensing-and-reflecting optical elements to the illumination area. Therefore, an advantage is provided that the illumination efficiency can be improved.

In the present invention, an optical-path-changing optical element for changing an optical path of light emitted from the polarization conversion optical element can be disposed on the side of the emitting surface of the polarization conversion optical element. If the optical-path-changing optical element is disposed so that illumination light can be emitted in a direction parallel to a plane defined by optical axes of two light source sections, the thickness of the polarizing illumination device in one direction can be reduced, and a low-profile polarizing illumination device can be realized. Therefore, when the polarizing illumination device is used as a light source of a projector or the like, a compact projector can also be obtained.

In the present invention, each of the condensing-and-reflecting devices of the first and second condensing-and-reflecting optical elements can be formed of a plurality of curved-surface reflecting mirrors. In addition, each of the condensing-and-reflecting devices of the first and second condensing-and-reflecting optical elements can be composed of a lens, and a reflecting surface provided on a surface of the lens opposite to the polarization separating optical element. With this construction, light from the light source sections can be easily divided into a plurality of intermediate luminous fluxes. Here, if the curved-surface reflecting mirrors are formed of decentering mirrors, or if the lens is formed of a decentering lens, the above-described polarization conversion optical element and the condensing optical element can be reduced in size, and the light can be effectively guided to the illumination area without using the above-described superimposing optical element.

The polarizing illumination device according to the present invention can be used in a projector having an optical modulation device for modulating light emitted from the polarizing illumination device, and a projection optical system for projecting the light modulated by the optical modulation device.

Furthermore, the polarizing illumination device according to the present invention can be used in a projector which has a color-light-separating optical element for separating light emitted from the polarizing illumination device into a plurality of color light, a plurality of optical modulation devices for modulating each of the color light separated by the color-light-separating optical element, a color-light-synthesizing optical element for synthesizing the light modulated by the plurality of optical modulation devices, and a projection optical system for projecting the light synthesized by the color-light-synthesizing optical element, and which can display a color image.

In addition, the polarizing illumination device according to the present invention can be used in a projector having a reflective optical modulation device for modulating light emitted from the polarizing illumination device, a polarization separating optical element for separating a plurality of polarized light components included in the light emitted from the polarizing illumination device and the light modulated by the reflective optical modulation device, and a projection optical system for projecting the light modulated by the reflective optical modulation device and emitted via the polarization separating optical element.

Furthermore, the polarizing illumination device according to the present invention can be used in a projector which has a plurality of reflective optical modulation devices for modulating light emitted from the polarizing illumination device, a polarization separating optical element for separating a plurality of polarized light components included in the light emitted from the polarizing illumination device and the light modulated by the plurality of reflective optical modulation devices, a color-light-separating-and-synthesizing optical element disposed between the polarization separating optical element and the plurality of reflective optical modulation devices, for separating light emitted from the polarizing illumination device into a plurality of color light and synthesizing the color light emitted from the plurality of reflective optical modulation devices, and a projection optical system for projecting the light modulated by the reflective optical modulation devices and emitted via the color-light-separating-and-synthesizing optical element and the polarization separating optical element.

In addition, the polarizing illumination device according to the present invention includes a color-light-separating optical element for separating light emitted from the polarizing illumination device into a plurality of color light, a plurality of reflective optical modulation devices for modulating each of color light separated by the color-light-separating optical element, a plurality of polarization separating optical elements for separating a plurality of polarized light components included in each of the color light separated by the color-light-separating optical element and in each of the color light modulated by the plurality of reflective optical modulation devices, a color-light-synthesizing optical element for synthesizing the light modulated by each of the reflective optical modulation devices and emitted via each of the polarization separating optical element, and a projection optical system for projecting the light synthesized by the color-light-synthesizing optical element, and can also be used in a projector.

In this way, when a projector using the polarizing illumination device of the present invention, a bright, and uniformly bright projection image can be obtained. Since the polarizing illumination device of the present invention emits luminous fluxes polarized in the same direction, it is suitable for a projector using liquid crystal devices as optical modulation devices.

In the above-described projector, at least one of the first and second light source sections may preferably be detachably constructed. With this construction, one of the light source sections can be detached when the projector is carried, thereby improving portability.

In addition, in the above-described projector, at least one of the first and second light source sections may preferably be selectively lit. With this construction, for example, when the projector is driven by a battery, the longevity of the battery can be extended by selectively lighting only one of the light sources. In addition, the brightness of a projection image can be appropriately changed according to the environment, or according to the preferences of the viewer such that two light source sections are lit when the projection image is viewed in a light place, and only one of them is selectively lit when the projection image is viewed in a dark place.

Furthermore, in the above-described projector, spectral characteristics and brightness characteristics of light emitted from the first and second light source sections can be allowed to differ from each other. With this construction, the hue of the illumination light can be easily set to a predetermined hue.

DESCRIPTION OF THE PREFERRED EMBODIMENTS

Embodiments of the present invention will now be described with reference to the drawings. In the following description of the embodiments and the attached drawings, mutually corresponding parts are indicated by the same numerals and repetition of description thereof is avoided. In addition, three mutually-perpendicular intersecting spatial axes are designated as the x-axis, the y-axis, and the z-axis, and linear polarized light beams having polarization axes parallel to the x-axis, the y-axis, and the z-axis are referred to as an x polarized light beam, a y-polarized light beam, and a z-polarized light beam, respectively. A system optical axis L1, which will be described later, is parallel to the x-axis, a system optical axis L is parallel to the y-axis, and a system optical axis L2 is parallel to the z-axis.

[First Embodiment]

Figure 1:
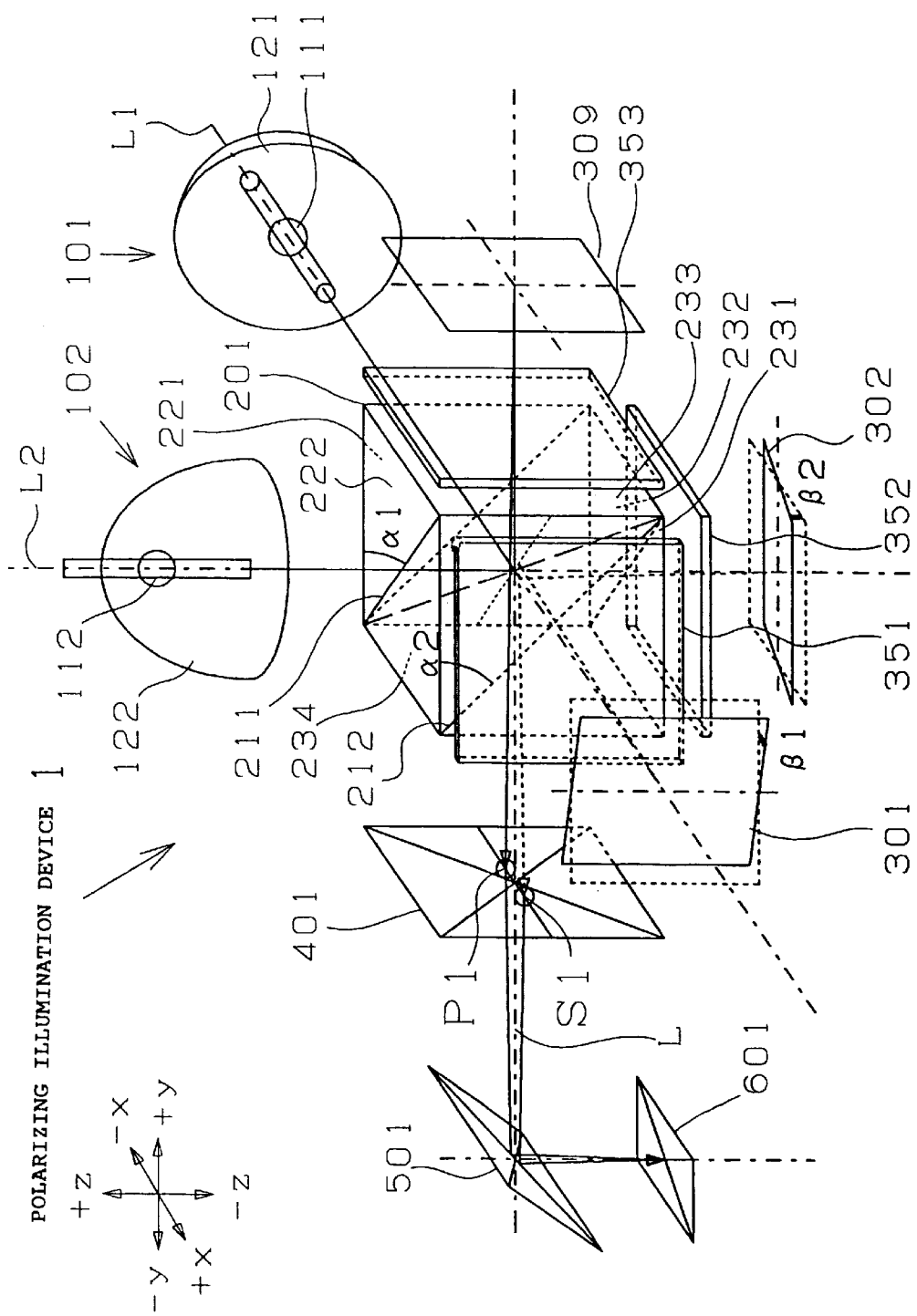
FIG. 1 schematically illustrates the construction of an optical system constructed in a polarizing illumination device according to a first embodiment of the present invention.

FIG. 1 is a perspective view showing a first embodiment of a polarizing illumination device of the present invention. In this embodiment, there are provided two light source sections, a first light source section 101 and a second light source section 102 that emit light polarized in random directions (hereinafter, referred to as "randomly polarized light beam").

As shown in FIG. 1, a polarizing illumination device 1 according to this embodiment includes, along system optical axes L1 and L intersecting at right angles in the xy plane, the first light source section 101, a polarization separating optical element 201, a first λ/4 phase film 351 (first polarization-state conversion optical element) and a third λ/4 phase film 353 (third polarization-state conversion optical element), a first condenser mirror plate 301 (first condensing-and-reflecting optical element) and a reflecting mirror element 309 (reflecting optical element), a condenser lens section 401 (condensing optical element, polarization conversion optical element, superimposing optical element), and a fold-back reflecting mirror 501 (optical-path-changing optical element). A randomly polarized light beam emitted from the first light source 101 is, as will be described later, separated into two types of polarized light beams by the polarization separating optical element 201, is synthesized into one type of polarized light beam by the first λ/4 phase film 351, the first condenser mirror plate 301, the third λ/4 phase film 353, the reflecting mirror element 309, the polarization separating optical element 201, the second light source section 102, and the condenser lens section 401, and then, reaches a rectangular illumination area 601 via the fold-back reflecting mirror 501.

In addition, arranged along system optical axes L2 and L, intersecting at right angles in the yz plane are the second light source section 102, the polarization separating optical element 201, a second λ/4 phase film 352 (second polarization-state conversion optical element) and the third λ/4 phase film 353, a second condenser mirror plate 302 (second condensing-and- reflecting optical element) and the reflecting mirror element 309, the condenser lens section 401, and the fold-back reflecting mirror 501. A randomly polarized light beam emitted from the second light source section 102 is, as will be described later, separated into two types of polarized light beams by the polarization separating optical element 201, is synthesized into one type of polarized light beam as in the case the first light source section 101 by the second λ/4 phase film 352, the second condenser mirror plate 302, the third λ/4 phase film 353, the reflecting mirror element 309, the polarization separating optical element 201, the first light source section 101, and the condenser lens section 401, and similarly reaches the rectangular illumination area 601 via the fold-back reflecting mirror 501. Therefore, the rectangular illumination area 601 is illuminated by almost one type of polarized light beam. The direction of emission of the illumination light, which is caused by the fold-back reflecting mirror 501 to change its direction of travel through an angle of about 90 degrees, is nearly parallel to the plane including the first and second light source sections 101 and 102.

Here, the system optical axis L1 substantially coincides with the central axis of light emitted from the first light source section 101, the system optical axis L2 substantially coincides with the central axis of light emitted from the second light source section 102, and the system optical axis L substantially coincides with the central axis of synthesized light emitted from the polarization separating optical element 201.

The first and second light source sections 101 and 102 are generally composed of light source lamps 111 and 112, and parabolic reflectors 121 and 122, respectively, and randomly polarized light beams radiated from the light source lamps 111 and 112 are reflected in one direction by the parabolic reflectors 121 and 122, are converted into nearly parallel luminous fluxes, and enter the polarization separating optical element 201. Here, instead of the parabolic reflectors 121 and 122, elliptical reflectors, spherical reflectors and the like can be used. In this case, however, an optical element for approximately collimating luminous fluxes emitted from the first and second light source sections 101 and 102 may preferably be disposed on the incident-side of the polarization separating optical element 201.

The polarization separating optical element 201 is a polarizing beam splitter having nearly the shape of a hexahedron, and a structure in which first and second polarization separating films 211 and 212 formed of dielectric multilayer films are contained in a prism made of glass. The first polarization separating film 211 is disposed at an angle with respect to the emitted light from the first light source section 101 so as to form an angle α1 of 45 degrees with respect to a first surface 221 of the polarization separating optical element 201 (that is, form an angle of 45 degrees with respect to the system optical axis L1). In addition, the second polarization separating film 212 is disposed at an angle with respect to emitted light from the second light source section 102 so as to form an angle α2 of 45 degrees with respect to a second surface 222 of the polarization separating optical element 201 (that is, form an angle of 45 degrees with respect to the system optical axis L2).

Figure 2:
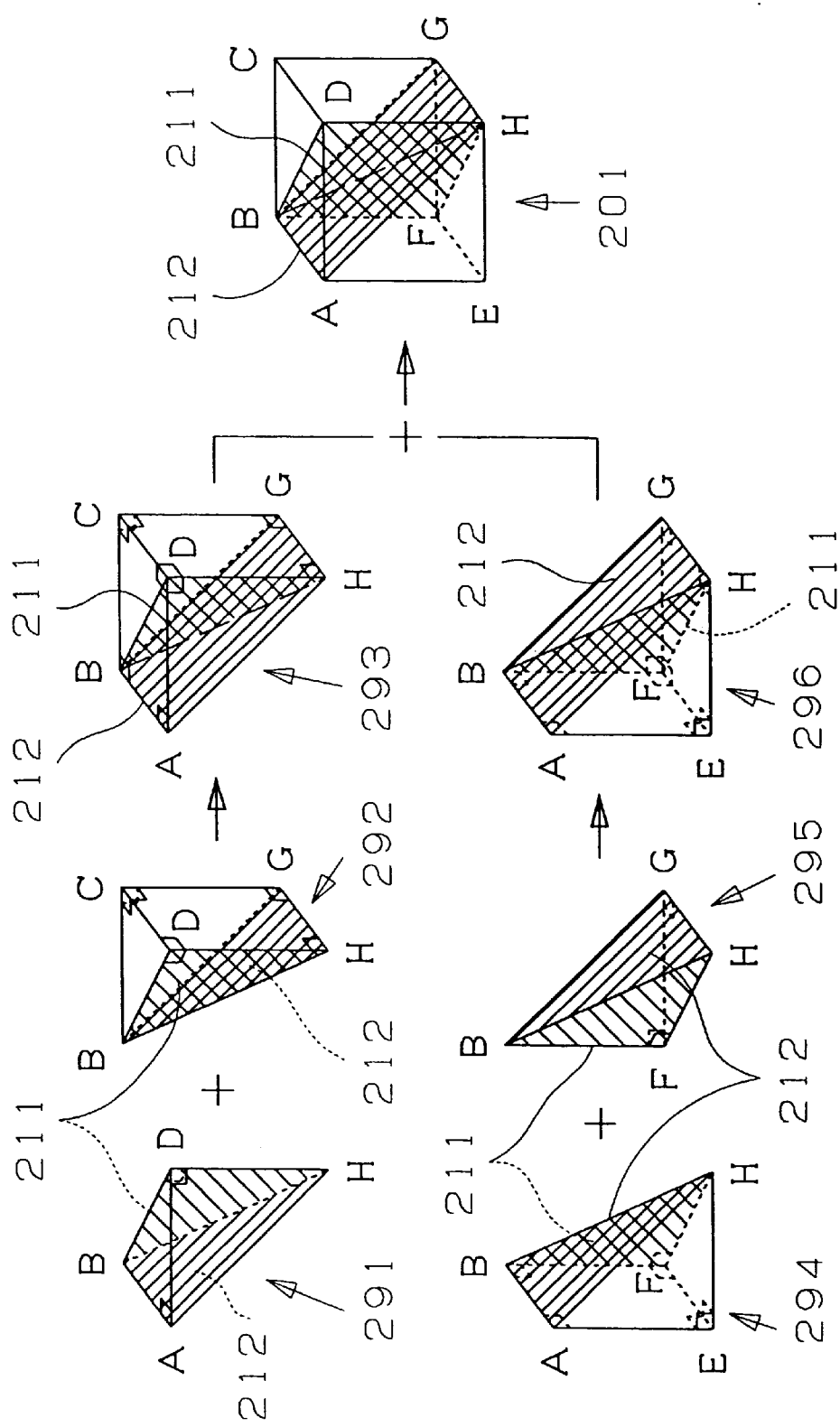
FIG. 2 is a diagram for explaining a detailed structure of a polarization separating optical element 201.

FIG. 2 is a diagram for explaining a detailed structure of the polarization separating optical element 201. As shown in FIG. 2, the polarization separating optical element 201 is composed of two triangular-pyramid prisms 291 and 295, and two quadrangular-pyramid prisms 292 and 294.

The first polarization separating films 211 are formed between a side face BDH of the first triangular-pyramid prism 291 and a side face BDH of the first quadrangular-pyramid prism 292, and between a side face BFH of the second quadrangular-pyramid prism 294 and a side face BFH of the second triangular-pyramid prism 295. This first polarization separating film 211 is formed by, for example, evaporating dielectric multilayer films on one of the side faces BDH of the first triangular-pyramid prism 291 and the side face BDH of the first quadrangular-pyramid prism 292, and on one of the side face BFH of the second quadrangular-pyramid prism 294 and the side face BFH of the second triangular-pyramid prism. Here, the first polarization separating film 211 may be formed on any one of the side face BDH of the fist triangular-pyramid prism 291 and the side face BDH of the first quadrangular-pyramid prism 292, and on any one of the side face BFH of the second triangular-pyramid prism 294 and the side face BFH of the second triangular-pyramid prism 295. Since the first polarization separating film 211 to be formed on two prisms is required to be flat, however, it is preferable that the first polarization separating film 211 be formed on the side face BDH of the first triangular-pyramid prism 291 and the side face BFH of the second quadrangular-pyramid prism 294, or on the side face BDH of the first quadrangular-pyramid prism 292 and the side face BFH of the second triangular-pyramid prism 295.

On the other hand, the second polarization separating films 212 are formed between a side face ABH of the first triangular-pyramid prism 291 and a side face ABH of the second quadrangular-pyramid prism 294, and between a side face BGH of the first quadrangular-pyramid prism 292 and a side face BGH of the second triangular-pyramid prism 295. This second polarization separating film 212 is formed by evaporating dielectric multilayer films on one of the side faces ABH of the first triangular-pyramid prism 291 and the side face ABH of the second quadrangular-pyramid prism 294, and on one of the side face BGF of the first quadrangular-pyramid prism 292 and the side face BGH of the second triangular-pyramid prism 295. Here, the second polarization separating film 212 may be formed on any one of the side face ABH of the fist triangular-pyramid prism 291 and the side face ABH of the second quadrangular-pyramid prism 294, and on any one of the side face BGH of the first quadrangular-pyramid prism 292 and the side face BGH of the second triangular-pyramid prism 295. Since the second polarization separating film 212 to be formed on two prisms is required to be flat, however, it is preferable that the second polarization separating film 212 be formed on the side face ABH of the first triangular-pyramid prism 291 and the side face BGH of the first quadrangular-pyramid prism, or on the side face ABH of the second quadrangular-pyramid prism 294 and the side face BGH of the second triangular-pyramid prism 295.

Furthermore, the side faces BDH of the first triangular-pyramid prism 291 and the first quadrangular-pyramid prism 292, where the first polarization separating film 211 is formed, are bonded to each other, whereby a first prism assembly 293 is formed. In addition, the side faces BFH of the second quadrangular-pyramid prism 294 and the second triangular-pyramid prism 295, where the second polarization separating film 212 is formed, are bonded to each other, whereby a second prism assembly 296 is formed. Finally, side faces ABH of the two prism assemblies 293 and 296, where the second polarization separating film 212 is formed, are bonded to each other, whereby the polarization separating optical element 201 is completed. Of course, since the above-described order in which four prisms are assembled is just an example, the order is not limited to the above one.

A description will be given again with reference to FIG. 1. The first λ/4 phase film 351 is disposed so as to face a third surface 231 of the polarization separating optical element 201, and the first condenser mirror plate 301 is disposed outside the phase film. The first λ/4 phase film 351 is disposed substantially perpendicular to the system optical axis L1, and the first condenser mirror plate 301 is disposed so as to form a predetermined angle (the angle which the first condenser mirror plate 301 forms with the yz plane perpendicular to the system optical axis L1 is β1) with respect to the system optical axis L1. In addition, the third λ/4 phase film 353 is disposed so as to face a fourth surface 233 of the polarization separating optical element 201, and the reflecting mirror element 309 is disposed behind the phase film. The third λ/4 phase film 353 and the reflecting mirror element 309 are disposed to be substantially perpendicular to the system optical axis L. Furthermore, the second λ/4 phase film 352 is disposed so as to face a fifth surface 232 of the polarization separating optical element 201, and the second condenser mirror plate 302 is disposed behind the phase film. The second λ/4 phase film 352 is disposed to be substantially perpendicular to the system optical axis L2, and the second condenser mirror plate 302 is disposed so as to form a predetermined angle (the angle which the second condenser mirror plate 302 forms with the yz plane perpendicular to the system optical axis L1 is β2) with respect to the system optical axis L2. Details of the construction and arrangement of the first and second condenser mirror plates 301 and 302 will be described later. Although the first to third λ/4 phase films 351, 352, and 353 shown in FIG. 1 are, prior to plain view, apart from the polarization separating optical element 201, they may be preferably disposed in close contact with the polarization separating optical element 201, or the first and second condenser mirror plates 301 and 302.

On the side of a sixth surface 234 of the polarization separating optical element 201, the condenser lens section 401, which will be described later, composed of a condenser lens plate 411 (condensing optical element), a λ/2 phase film 421 (polarization conversion optical element), and a superimposing lens 431 (superimposing optical element), is disposed in a direction perpendicular to the system optical axis L.

A description will be given of the processes in which a randomly polarized light beam emitted from the first light source section 101 is separated into two types of polarized light beams, and one polarized light beam is guided to the condenser lens plate 401, and the other polarized light beam is guided to the second light source section 102 in the thus-constructed polarizing illumination device 1.

Figure 3:
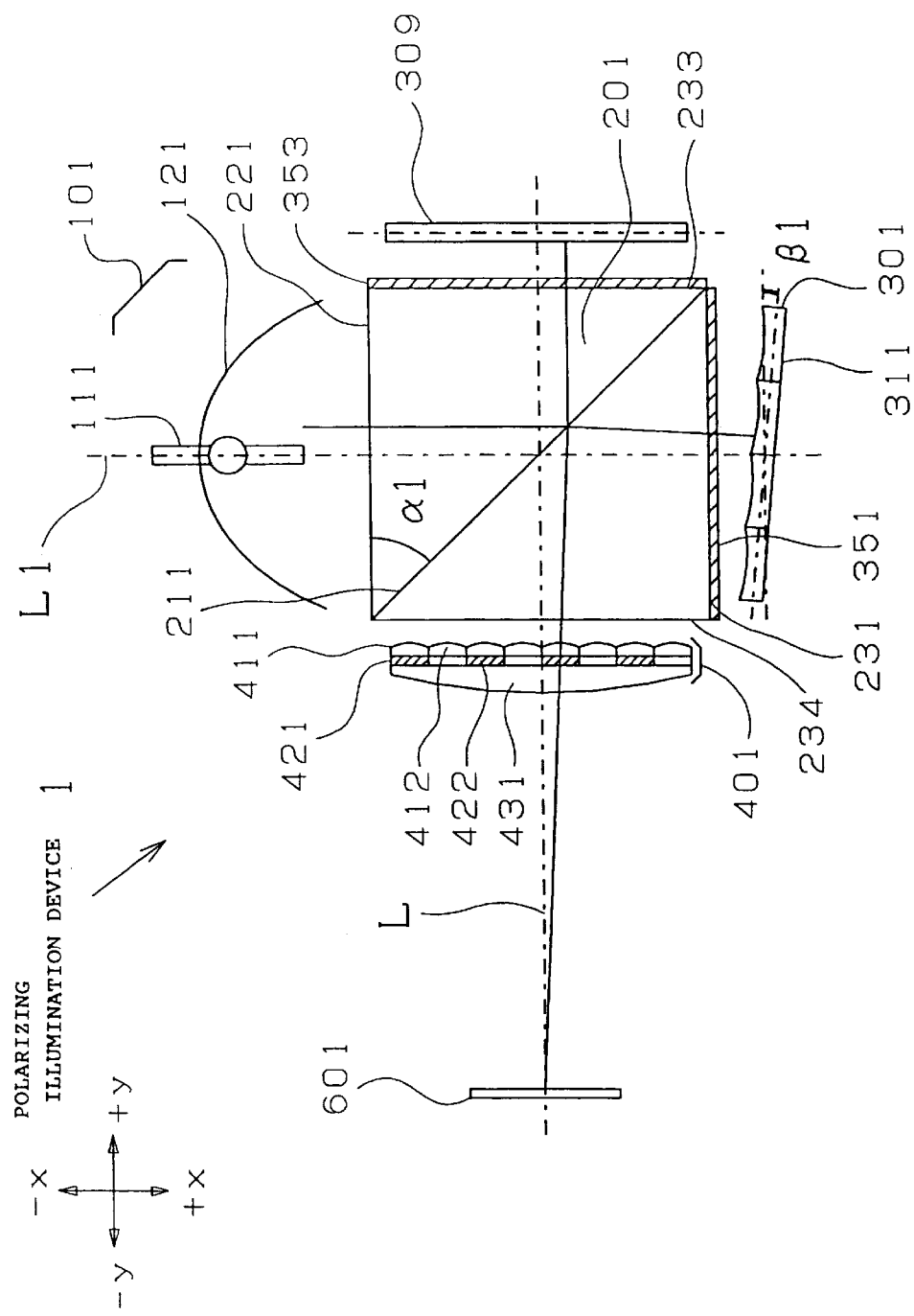
FIG. 3 schematically illustrates the basic construction of an optical system constructed in the polarizing illumination device according to the first embodiment of the present invention.
Figure 9:
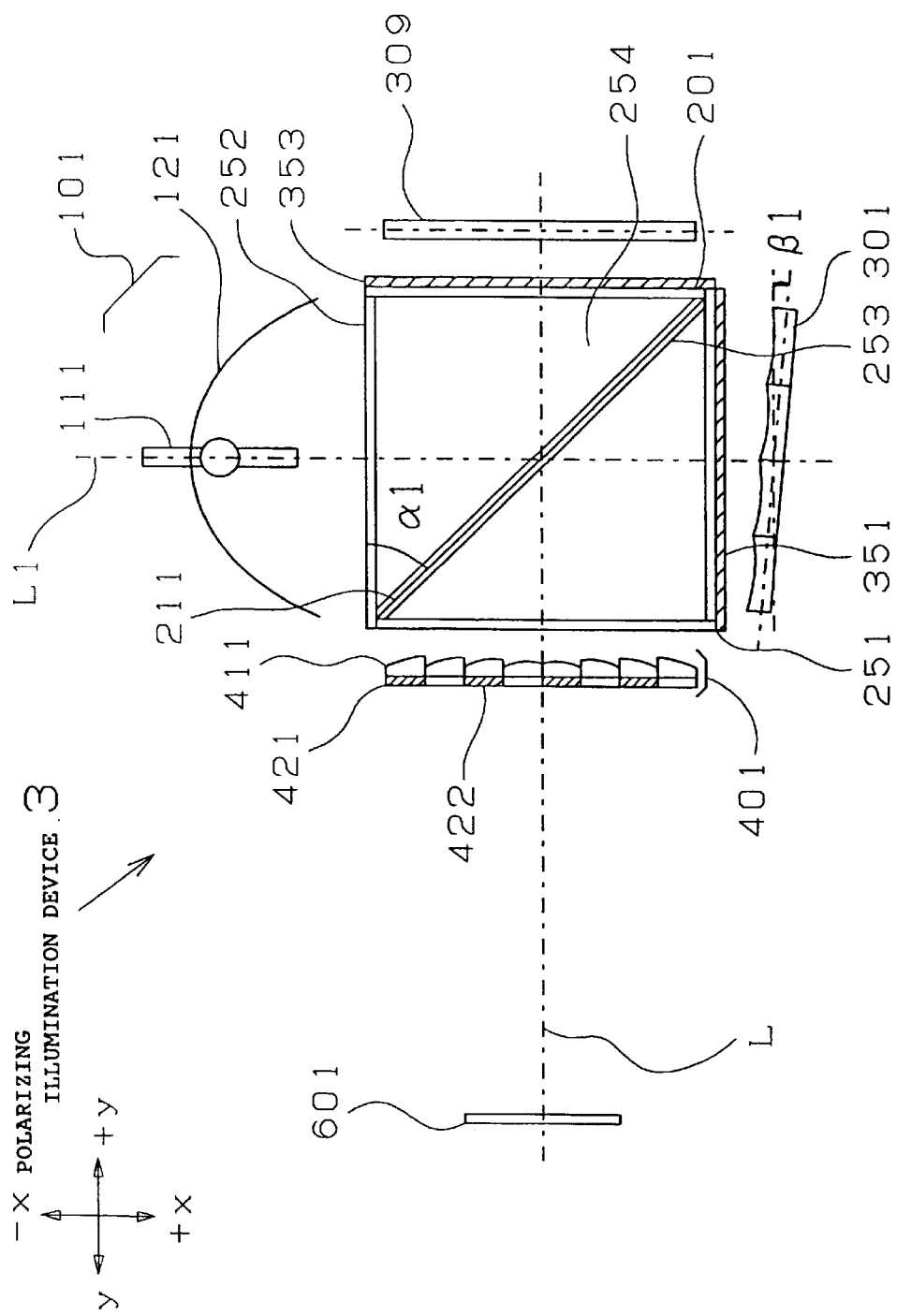
FIG. 9 schematically illustrates the basic construction of an optical system constructed in a polarizing illumination device according to a third embodiment of the present invention.

FIG. 3 is a sectional view taken along the xy plane in FIG. 1. Here, it should be noted that the second polarization beam separation film 212, which is not shown in FIG. 3, is formed in the polarization separating optical element 201 in such a manner as to cross the xy plane. Furthermore, the fold-back reflecting mirror 501 is omitted, because it is not directly related to the description of the processes, and therefore, the optical path from the condenser lens section 401 to the illumination area 601 is shown as a straight line. This also applies to FIGS. 9 and 10 that will be described later.

The randomly polarized light beam emitted from the first light source section 101 can be regarded as combination light of a y-polarized light beam and a z-polarized light beam. The combination light, which is emitted from the first light source section 101 and enters the first surface 221 of the polarization separating optical element 201, is separated into two types of polarized light beams, the y-polarized light beam and the z-polarized light beam. That is, the y-polarized light beam included in the randomly polarized light beam passes unchanged through the first polarization separating film 211 and travels toward the third surface 231, while the z-polarized light beam is reflected by the first polarization separating film 211, and changes its direction of travel toward the fourth surface 233 of the polarization separating optical element 201.

The two types of polarized light beams separated by the polarization separating optical element 201 pass through the first and third λ/4 phase films 351 and 353, and are reflected by the first condenser mirror plate 301 and the reflecting mirror element 309, respectively.

Figure 4:
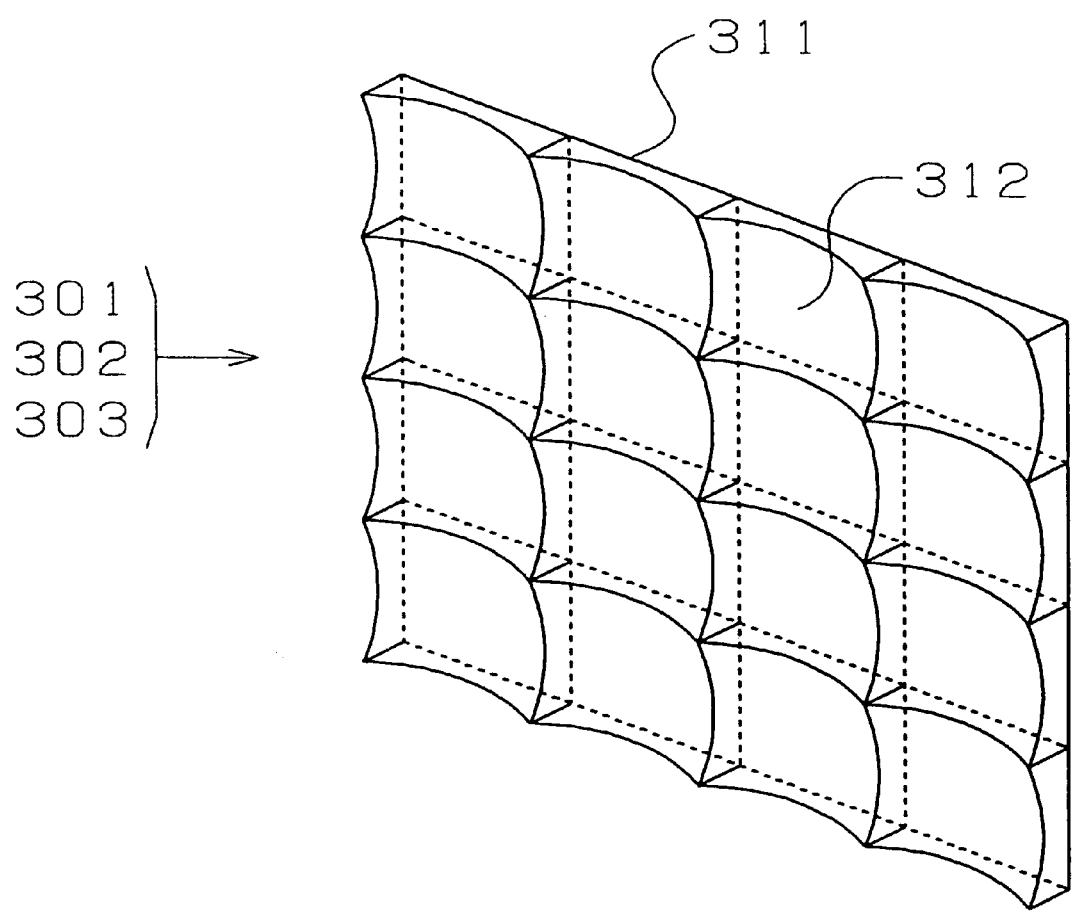
FIG. 4 is a perspective view of a condenser mirror plate of the polarizing illumination device shown in FIG. 1.

As shown in FIG. 4 showing the outer appearance, the first condenser mirror plate 301 is formed by arranging in a matrix a plurality of condenser mirrors 311, each having a rectangular outer shape that is almost similar to that of the illumination area 601, and forming reflecting surfaces 312 by aluminum-evaporated films, dielectric multilayer films, and the like, on the surfaces of the condenser mirrors. In this embodiment, the reflecting surfaces 312 of the condenser mirrors 311 are formed in a spherical shape. The curved form of the reflecting surfaces 312 may be parabolic, spherical, or toric, and it can be set according to the properties (for example, parallelism) of incident light from the first and second light source sections 101 and 102. Incidentally, the second condenser mirror plate 302 that will be described later has a similar construction. On the other hand, the reflecting mirror element 309 is a general plate-like reflecting mirror having reflecting surfaces 312 consisting of aluminum-evaporated films or dielectric multilayer films formed thereon.

Figure 5:
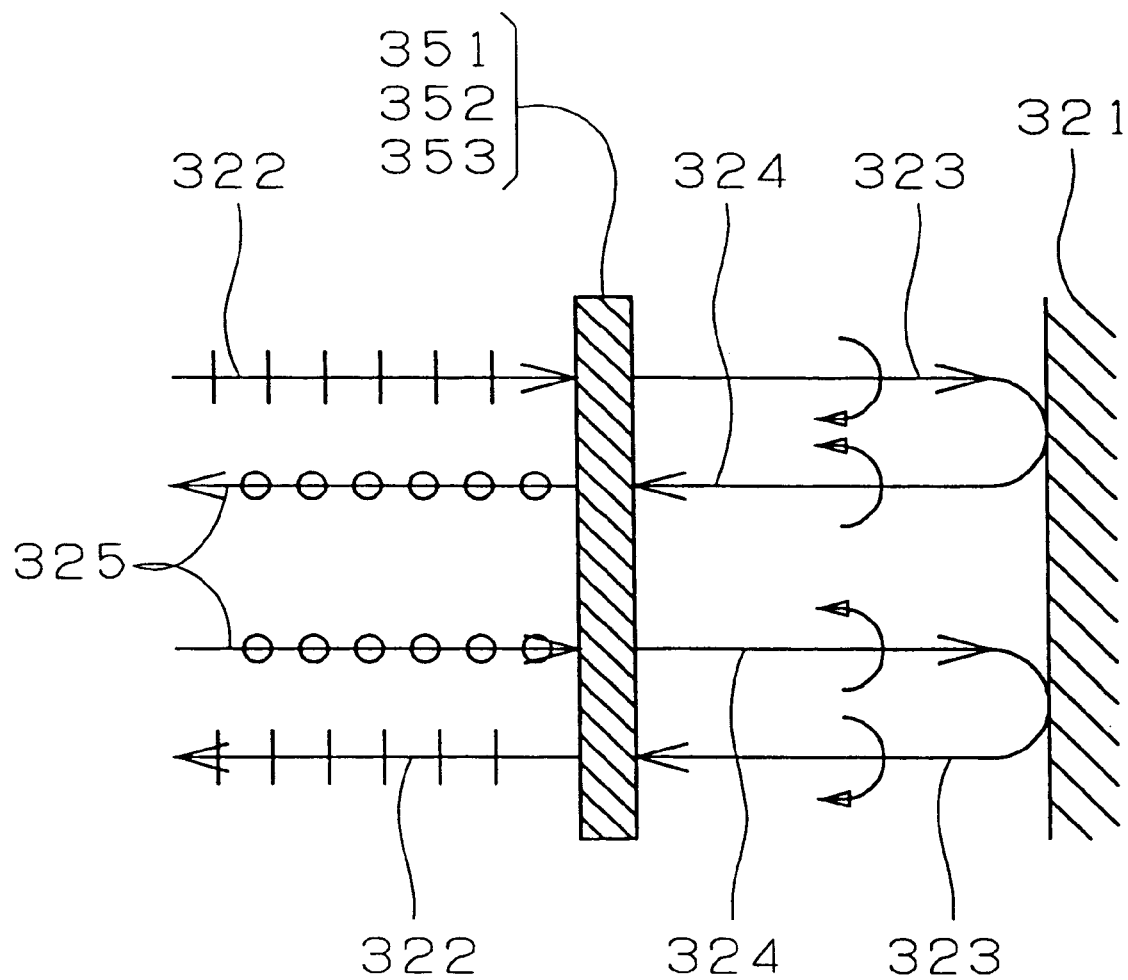
FIG. 5 is an explanatory view showing a polarizing operation performed in the polarizing illumination device shown in FIG. 1.

The y-polarized light beam and the z-polarized light beam separated by the first polarization separating film 211 respectively pass through the first and third $\lambda/4$ phase films 351 and 353, are reflected by the first condenser mirror plate 301 and the reflecting mirror element 309, and pass again through the $\lambda/4$ phase films 351 and 353, while the directions of travel of the polarized light beams are reversed through about 180 degrees, and simultaneously, the directions of polarization are rotated through 90 degrees. The change of the polarized light beams will be described with reference to FIG. 5. In this figure, the condenser mirror plate 301 is shown as a flat mirror plate 321, and the mirror plate 321 is disposed nearly parallel to the $\lambda/4$ phase film 351 for simplifying the description. A y-polarized light beam 322 that is incident on the $\lambda/4$ phase film 351 is converted by the $\lambda/4$ phase film into a right-handed circularly polarized light beam 323 (into a left-handed circularly polarized light beam depending on the way the $\lambda/4$ phase film is arranged), and reaches the mirror plate 321. The light is reflected by the mirror plate 321, and simultaneously, the direction of rotation of the polarization direction is changed. That is, the right-handed circularly polarized light beam changes to the left-handed circularly polarized light beam (the left-handed circularly polarized light beam changes to the right-handed circularly polarized light beam). The polarized light beam, whose direction of travel is reversed through about 180 degrees by the mirror plate 321 and which is simultaneously converted into the left-handed circularly polarized light beam, passes again through the $\lambda/4$ phase films 351 and 353, where it is converted into a z-polarized light beam 325. In addition, the z-polarized light beam 325 is converted into the y-polarized light beam 322 through similar processes.

A description will be given again with reference to FIG. 3. The y-polarized light beam that reaches the third surface 231 is caused by the first $\lambda/4$ phase film 351 and the first condenser mirror plate 301 to reverse its direction of travel through about 180 degrees, and simultaneously, is converted into a z-polarized light beam, and is reflected by the first polarization separating film 211 so that its direction of travel is changed, and travels toward the sixth surface 234. In this case, since the second polarization separating film 212 (not shown) is disposed substantially perpendicular to the yz plane, the z-polarized light beam is not affected very much by the second polarization separation film 212.

Since the first condenser mirror plate 301 is composed of the condenser mirrors 311 each having a condensing function, the directions of travel of polarized light beams are approximately reversed, and as many focal images as the number of the condenser mirrors 311 constituting the condenser mirror plate 301 are formed. Since these focal images are none other than light source images, they are referred to as secondary light source images hereinafter. In this embodiment, the condenser lens section 401 is disposed near a position where the secondary light source images are formed. That is, the z-polarized light beam emitted from the sixth surface 234 form a plurality of secondary light source images at a predetermined position of the condenser lens section 401.

Here, the first condenser mirror plate 301 is disposed in a state of not being perpendicular to the system optical axis L1, that is, so that it is rotated around the z-axis to form a predetermined angle (the angle which the first condenser mirror plate 301 forms with the yz plane perpendicular to the system optical axis L1 is $\beta1$). Therefore, the z-polarized light beam reflected by the condenser mirrors 311 of the first condenser mirror plate 301 enters the conceptually shown position P of the condenser lens section 401 with an approximately central axis thereof slightly inclined with respect to the system optical axis L (the approximately central axis is inclined by $2\cdot\beta1$ degrees with respect to the system optical axis L)(See FIG. 1). That is, a plurality of secondary light source images of the z-polarized light beam formed by the first condenser mirror plate 301 are formed at a position in the condenser lens section 401 slightly shifted in the -x direction. The amount of shift is determined by $\beta1$, and the distance between the first condenser mirror plate 301 and the condenser lens section 401.

On the other hand, the reflecting mirror plate 309 and the third $\lambda/4$ phase film 353 are disposed so that they are perpendicular to the system optical axis L, and approximately central axes thereof are located on the system optical axis L. Therefore, the z-polarized light beam that reaches the fourth surface 233 is caused by the third $\lambda/4$ phase film 353 and the reflecting mirror element 309 to reverse its direction of travel through about 180 degrees, and simultaneously, is converted into an x-polarized light beam to return to the polarization separating optical element 201. Here, since the second polarization separating film 212 (not shown) is disposed substantially perpendicular to the yz plane, the x-polarized light beam is reflected by the second polarization separating film 212, and travels toward the second light source section 102 (not shown). As described using FIG. 3, y-polarized light beam of the randomly polarized light beams emitted from the first light source section 101 is converted to z-polarized light to enter the condenser lens section 401, while z-polarized light beam is converted to x-polarized light beam to enter the second light source section 102 which is not shown.

Next, a description will be given with reference to FIG. 1 of the processes in which a randomly polarized light beam emitted from the second light source section 102 is guided to the condenser lens plate 401 or to the first light source section 101. A randomly polarized light beam emitted from the second light source section 102 is also separated into an x-polarized light beam and a y-polarized light beam through principally similar processes to those of the randomly polarized light beam emitted from the first light source section 101, the y-polarized light beam is converted into an x-polarized light beam to enter the condenser lens section 401, and the x-polarized light beam is converted into a z-polarized light beam to enter the first light source section 101. That is, of the randomly polarized light beam emitted from the second light source section 102, the y-polarized light beam passes unchanged through the second polarization separating film 212 of the polarization separating optical element 201 to travel toward the fifth surface 232, and the x-polarized light beam is reflected by the second polarization separating film 212 to change its direction of travel toward the fourth surface 233. The thus-separated y-polarized light beam and x-polarized light beam are respectively pass through the second and third $\lambda/4$ phase films 352 and 353, are reflected by the second condenser mirror plate 302 and the reflecting mirror element 309, and pass through the $\lambda/4$ phase films 352 and 353 again. Therefore, the y-polarized light beam that reaches the fifth surface 232 is caused by the second $\lambda/4$ phase film 352 and the second condenser mirror plate 302 to reverse its direction of travel through about 180 degrees, and simultaneously, is converted into an x-polarized light beam, is reflected by the second polarization separating film 212 to change its direction of travel, and travels toward the sixth surface 234. In this case, since the first polarization separating film 211 is disposed substantially perpendicular to the xy plane, the x-polarized light beam is not affected very much by the first polarization separation film 211.

On the other hand, the x-polarized light beam that reaches the fourth surface 233 is caused by the third λ/4 phase film 353 and the reflecting mirror element 309 to reverse its direction of travel through about 180 degrees, and simultaneously, is converted into a z-polarized light beam, is reflected by the first polarization separating film 211 again to change its direction of travel through about 90 degrees, and travels toward the first light source section 101.

Here, in a manner similar to the first condenser mirror plate 301, the second condenser mirror plate 302 is composed of the condenser mirrors 311 each having a condensing function, and is disposed in a state of not being perpendicular to the system optical axis L2, that is, so that it is rotated around the y-axis to form a predetermined angle (the angle which the second condenser mirror plate 302 forms with the yz plane perpendicular to the system optical axis L1 is β2) with respect to the system optical axis L2. Therefore, the x-polarized light beam reflected by the condenser mirrors 311 of the second condenser mirror plate 302 enters the conceptually shown position S of the condenser lens section 401 with an approximately central axis thereof slightly inclined with respect to the system optical axis L (the approximately central axis is inclined by 2·β2 degrees with respect to the system optical axis L). That is, a plurality of secondary light source images of the x-polarized light beam formed by the second condenser mirror plate 302 are formed at a position in the condenser lens section 401 slightly shifted in the +x direction. The amount of shift is determined by β2, and the distance between the second condenser mirror plate 302 and the condenser lens section 401.

Next, a description will be given of the processes in which the luminous fluxes guided to the condenser lens section 401 are polarized in the same direction, and reach the illumination area 601.

Figure 6:
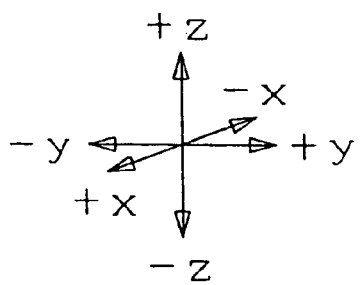
FIG. 6 is a perspective view of a lens plate of the polarizing illumination device shown in FIG. 1.
Figure 6:
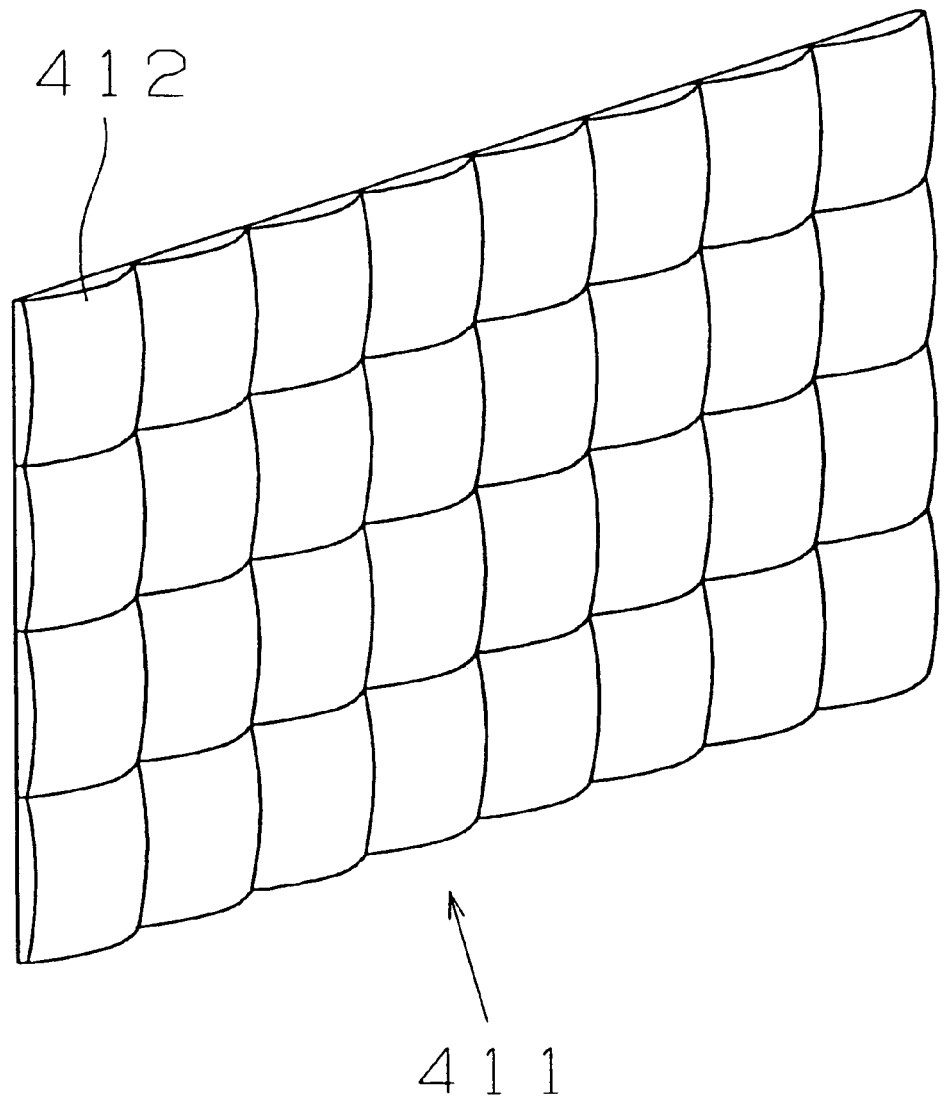

The condenser lens plate 411 constituting the condenser lens section 401 is a composite lens member composed of rectangular microlenses 412, as shown in FIG. 6, which shows the outer appearance, and is composed of as many, or twice as many microlenses 412 as the number of condenser mirrors 311 that constitute the first and second condenser mirror plates 301 and 302. However, when the first and second condenser mirror plates 301 and 302 are composed of different numbers of condenser mirrors 311, the number of condenser mirrors 311 may be controlled based on the condenser lens plate having the largest number of condenser mirrors 311. In this embodiment, the condenser lens plate 411 is composed of twice as many microlenses 412 as the number of condenser mirrors 311 that constitute the first condenser mirror plate 301. In addition, as will be described later, in order to condense polarized light beams from the first and second light source sections 101 and 102 at spatially different positions, the microlenses 412 are arranged so as to correspond the condensed positions of the polarized light beams. In this embodiment, in order to shift secondary light source images formed by light from the first light source section 101 and secondary light source images formed by light from the second light source section 102 slightly in the x-axis direction so that they do not overlap each other, the number of microlenses 412 arranged in the x-axis direction is set to be twice as many microlenses 412 as the number of condenser mirrors 311 that constitute the first condenser mirror plate 301 (second condenser mirror plate 302).

Figure 7:
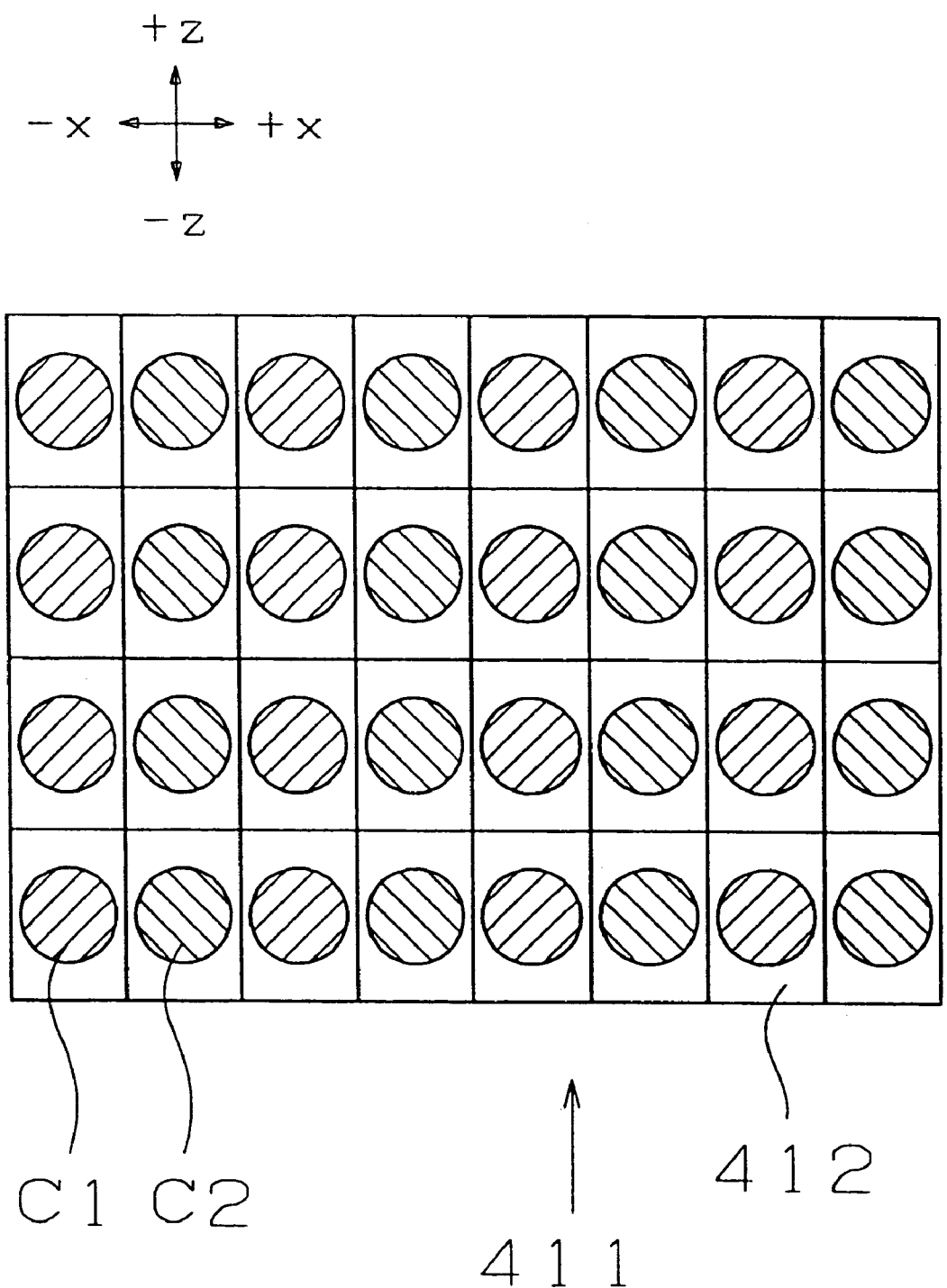
FIG. 7 is an explanatory view showing the positions of secondary light source images formed in the condenser lens plate of the polarizing illumination device shown in FIG. 1.

Here, as shown in FIG. 7, when the condenser lens plate 411 is viewed from the side of the fold-back reflecting mirror 501, secondary light source images C1 formed by the x-polarized light beam (circular images that are shaded by oblique lines slanting up to the right) are formed to correspond to the mircolenses 412 in the z-axis direction, while they are formed to correspond to alternate microlenses 412 in the x-direction. Similarly, secondary light source images C2 formed by the z-polarized light beam (circular images that are shaded by oblique lines slanting up to the left) are formed to correspond to the mircolenses 412 in the z-axis direction, while they are formed to correspond to alternate microlenses 412 in the x-direction. Therefore, the secondary light source images C1 formed by the polarized light beam from the first light source section 101 and the secondary light source images C2 formed by the polarized light beam from the second light source section 102 are arranged alternately in the x-axis direction. This is because, as described previously, the first condenser mirror plate 301 is disposed in a state of being rotated around the z-axis and inclined by a predetermined angle (the angle which the first condenser mirror plate 301 forms with the yz plane perpendicular to the system optical axis L1 is β1) with respect to the system optical axis L1, and the second condenser mirror plate 302 is disposed in a state of being rotated around the y-axis and inclined by a predetermined angle (the angle which the second condenser mirror plate 302 forms with the yz plane perpendicular to the system optical axis L1 is β2) with respect to the system optical axis L2. While the number of microlenses 412 that constitute the condenser lens section 401 is set to be twice as many the number of the condenser mirrors 311 in this embodiment, if inclination angles of the first and second condenser mirror plates 301 and 302 with respect to the system optical axes L1 and L2 is set to be equal to each other (that is, β1=β2), the approximately central axis of the z-polarized light beam from the first condenser mirror plate 301 and the approximately central axis of the x-polarized light beam from the second condenser mirror plate 302 that enter the condenser lens section 401 are symmetric with respect to the system optical axis L. Therefore, one microlens 412 can correspond to a pair of secondary light source images (C1 and C2) arranged in the x-axis direction. In this case, the number of microlenses 412 arranged on the condenser lens section 401 in the x-direction is equal to that of the condenser mirrors 311 arranged on the first condenser mirror plate 301 or the second condenser mirror plate 302 in the x-axis direction.

Therefore, the z-polarized light beam that is emitted from the first light source section 101 to enter the condenser lens section 401 via the first condenser mirror plate 301, and the x-polarized light beam that enters the condenser lens section 401 via the second condenser mirror plate 302 enter the condenser lens section 401 in a state where approximately central axes thereof are not parallel to each other and do not overlap each other, and form secondary light source images at spatially different positions, respectively. In short, in this stage, two types of polarized light beams are spatially separated from each other due the differences of direction of polarization.

Formed on the surface of the condenser lens plate 411 on the side of the fold-back reflecting mirror 501 is the λ/2 phase film 421 having phase layers 422 that are selectively formed corresponding to the positions of the secondary light source images C1 of the x-polarized light beam. Therefore, the x-polarized light beam is subjected to a rotation action of the polarization axis when passing through the phase layers 422, and is converted into a z-polarized light beam. On the other hand, since phase layers 422 are not formed on the optical path of the z-polarized light beam, the z-polarized light beam passes through the λ/2 phase film 421 in the state of the z-polarized light beam without being subjected to the rotation action of the polarization axis. For this reason, most light emitted from the condenser lens section 401 is united into z-polarized light beam.

The light thus united into the z-polarized light beam is superimposed on one point in the illumination area 601 by the superimposing lens 431 disposed on the surface of the λ/2 phase film 421 that is on the side of the fold-back reflecting mirror 501. In this case, as shown in FIG. 1 (omitted in FIG. 3) illumination light reaches the illumination area 601 after it is caused by the fold-back reflecting mirror 501, disposed between the superimposing lens 431 and the illumination area 601, to bend its direction of travel through about 90 degrees to become a y-polarized light beam. That is, a plurality of intermediate luminous fluxes, which are cut out by the condenser mirrors 311 of the first and second condenser mirror plates 301 and 302, are superimposed on one point by the condenser lens plate 411 and the superimposing lens 431, and are converted into one type of polarized light beam when passing through the λ/2 phase film 421, whereby almost all light reaches the illumination area 601. Since the illumination area 601 is illuminated with a plurality of secondary light source images, there are considerably small variations in illumination intensity, and the illumination area 601 is uniformly illuminated by almost one type of polarized light beam.

Incidentally, while both of the x-polarized light beam that enters the second light source section 102 from the first light source section 101 via the polarization separating optical element 201, and the z-polarized light beam that enters, conversely, the first light source section 101 from the second light source section 102 via the polarization separating optical element 201 are reflected by the reflectors 121 and 122 of the light source sections and emitted from the light source sections, they are subjected to rotation action of the polarization axes during being reflected by the reflectors, and some of them are converted into polarized light beams that can pass through the first and second polarization separating films 212 and 212, and enter the first condenser mirror plate 301 or the second condenser mirror plate 302. Therefore, the polarized light beams that enter the first and second light source sections 101 and 102 eventually become polarized light beams that enter the condenser lens section 401, and are utilized effectively.

As described above, according to the polarizing illumination device 1 of this embodiment, each of the randomly polarized light beams emitted from the first and second light source sections 101 and 102 is separated into two types of polarized light beams by the polarization separating optical element 201, and guided to predetermined areas of the λ/2 phase film 421, where the x-polarization light beam is converted into the z-polarized light beam. Therefore, since the randomly polarized light beams emitted from the first and second light source sections 101 and 102 can be converted into almost one type of polarized light beam, without causing any loss, an advantage is provided that the illumination area 601 is brightly illuminated. In addition, although the two light source sections 101 and 102 are used, since it is possible to synthesize illumination light from the two light source sections 101 and 102 without increasing the incident angle (illumination angle) of the illumination light with respect to the illumination area, the cross-sectional area of the illumination light is the same as that in the case where a single light source section is used, and therefore, the amount of light per given illumination angle can be made double that in the case where a single light source section is used. Furthermore, both the two light source sections consisting of the first and second light source sections 101 and 102 can be disposed on the xz plane. In this case, since the fold-back reflecting mirror 501 is disposed to change the direction of travel of the illumination light emitted from the condenser lens section 401, the direction of emission of the illumination light can be made in parallel with the xz plane where the two light source sections are arranged. Therefore, the polarizing illumination device of this embodiment is suitable for the reduction in thickness and height. In short, the fold-back reflecting mirror 501 disposed behind the condenser lens section 401 increases the versatility of possible design for reducing the size of the polarizing illumination device.

Moreover, in order to guide two types of polarized light beams to predetermined areas of the λ/2 phase film 421, the polarization separating optical element 201 needs to have a high polarization beam separating ability. In this embodiment, since the polarization separating optical element 201 is constructed by utilizing a prism made of glass, and dielectric multilayer films made of an inorganic material, the polarization beam separating ability of the polarization separating optical element 201 is thermally stable. For this reason, an always stable polarization beam separating ability can be provided even in an illumination device that is required to produce high output, whereby a polarizing illumination device having satisfactory performance can be realized.

Furthermore, in this embodiment, in accordance with the rectangular shape that is long from side to side of the illumination area 601, the condenser mirrors 311 of the first and second condenser mirror plates 301 and 302 are formed in a rectangular shape that is long from side to side (almost similar to the shape of the illumination area), and simultaneously, the direction of separation of the two types of polarized light beams emitted from the polarization separating optical element 201 (the direction in which secondary light source images formed by the two types of polarized light beams are arranged) is set to a lateral direction (x direction) in accordance with the shape of the illumination area 601. For this reason, even when the illumination area 601 having a rectangular shape that is long from side to side is formed, the illumination efficiency can be increased without any loss in the amount of light. In addition, an increase in an incident angle of light with respect to the illumination area 601 can be restricted.

The angles and directions of inclination of the first and second condenser mirror plates 301 and 302 with respect to the system optical axes L1 (x-axis) and L2 (z-axis), which have been described in this embodiment, are not limited to those in the embodiment. In short, the angles of inclination of the first and second condenser mirror plates 301 and 302 and directions of inclination thereof may be set so that the secondary light source image of the z-polarized light beam emitted from the first light source section 101 via the first reflecting mirror plate 301, and the secondary light source images of the x-polarized light beam emitted from the second light source section 102 via the second reflecting mirror plate 302 are formed at spatially separated positions. Therefore, in contrast with this embodiment, the directions of inclination of the first and second condenser mirror plates 301 and 301 may be set conversely, and only one of the first and second condenser mirror plate 301 and 302 may be inclined. However, if the angles of inclination of the first and second condenser mirror plates 301 and 302 are set to be equal to each other, as in this embodiment, the incident angles of the z-polarized light beam and the x-polarized light beam with respect to the condenser lens section 401 are nearly symmetric with respect to the system optical axis L (y-axis), so that light from the first and second condenser mirror plates 301 and 302 enters the polarization separating optical element 201 at a relatively small angle. Therefore, even when the polarization beam separating characteristics of the polarization separating optical element 201 depend on the incident angle of light, polarization beam separation can be stably performed, whereby nearly uniform illumination light can be obtained. Furthermore, the number of microlenses 412 constituting the condenser lens section 401 can be reduced.

In addition, in order to allow the z-polarized light beam included in the emitted light from the first light source section 101 and the x-polarized light beam included in the emitted light from the second light source section 102 to enter efficiently the corresponding light source sections, it is preferable that the reflecting mirror element 309 be composed of plate-like reflecting mirror, and that the reflecting mirror element 309 be disposed so that about the center thereof is located on the approximately central axis of the polarization separating optical element 201.

In this embodiment, while the λ/2 phase film 421 is disposed on the side of the fold-back reflecting mirror 501 of the condenser lens plate 411, it may be disposed at other positions near the positions where secondary light source images are formed, and there is no limitation. For example, the λ/2 phase film 421 may be disposed on the side of the polarization separating optical element 201 of the condenser lens plate 411. Similarly, the superimposing lens 431 may be disposed on the side of the polarization separating optical element 201 of the condenser lens plate 411.

In addition, when the microlenses 412 constituting the condenser lens plate 411 are formed of decentering lenses, light being emitted from each of the microlenses 412 can be directed toward the illumination area 601, so that the condenser lens plate 411 also serves the function of the superimposing lens 431. Alternatively, when the condenser mirrors 311 constituting the first and second condenser mirror plates 301 and 302 are formed of decentering mirrors, light being emitted from each of the condenser mirrors 311 can be directed toward the illumination area 601, so that the first and second condenser mirror plates 301 and 302 also similarly serve the function of the superimposing lens 431. In these cases, the superimposing lens 431 can be omitted, so that the cost of the polarizing illumination device can be reduced.

In addition, when light emitted from the first and second light source sections 101 and 102 offers high parallelism, the condenser lens plate 411 can be omitted.

Furthermore, while the microlenses 412 constituting the condenser lens plate 411 are formed of rectangular lenses that are long from side to side, there are no specific limitations on the shape thereof. As shown in FIG. 7, however, since secondary light source images C2 formed by the z-polarized light beam and secondary light source images C1 formed by the x-polarized light beam are arranged in the lateral direction, the shape of the microlenses 412 constituting the condenser lens plate 411 may be preferably determined according to the positions where the secondary light source images are formed.

In addition, two types of phase layers having different characteristics may be disposed at the positions where secondary light source images are formed by the z-polarized light beam and the positions where secondary light source images are formed by the x-polarized light beam, respectively, such as to unite light beams into one type of polarized light beam that is polarized in one specific direction, and the phase layers 422 may be disposed at the positions where secondary light source images C2 are formed by the z-polarized light beam such as to make illumination light into x-polarized light beam.

[Second Embodiment]

Figure 8:
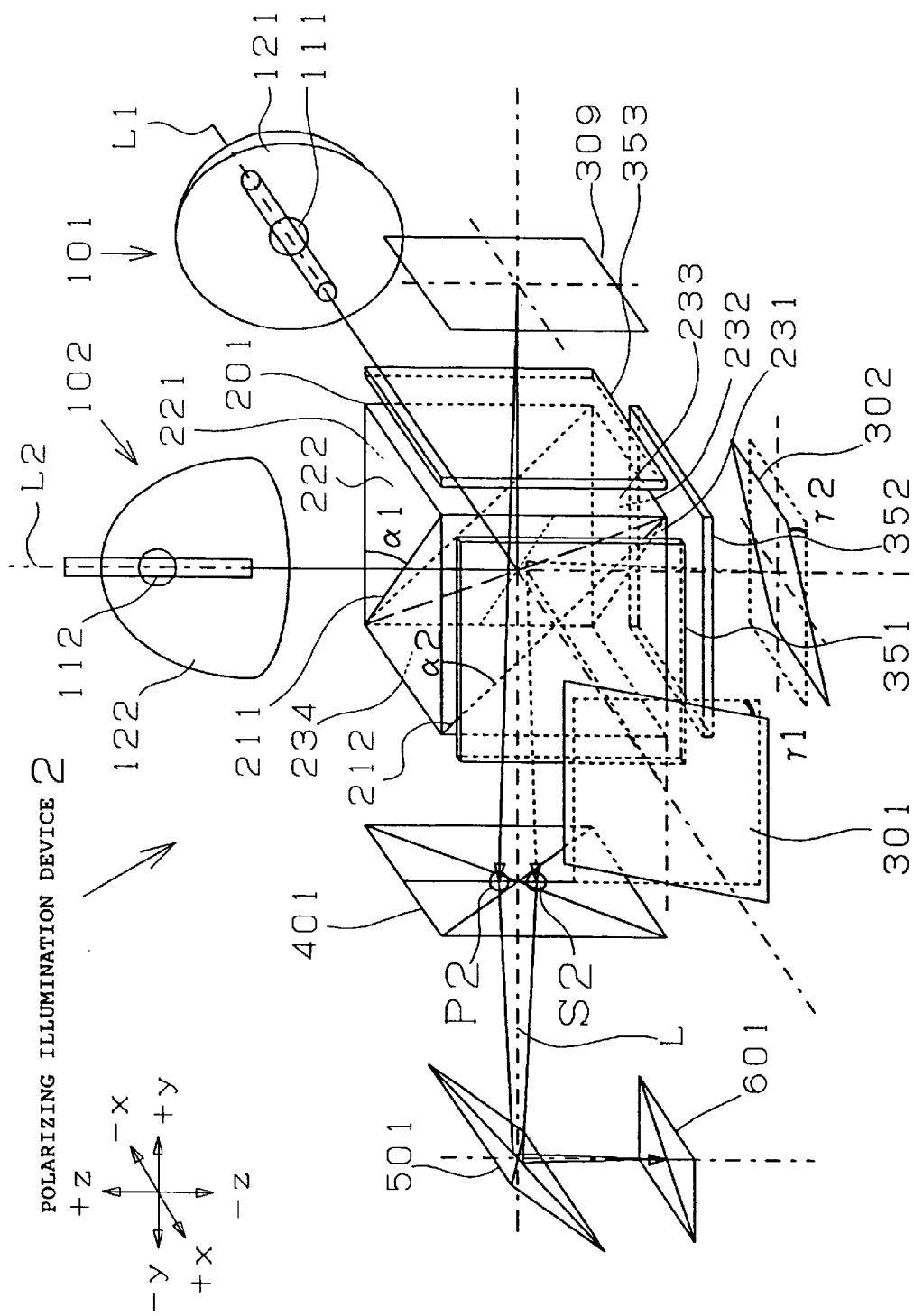
FIG. 8 schematically illustrates the construction of an optical system constructed in a polarizing illumination device according to a second embodiment of the present invention.

While the first and second condenser mirror plates 301 and 302 in the polarizing illumination device 1 shown in FIG. 1 are disposed so that the secondary light source images formed by the z-polarized light beam and the secondary light source images formed by the x-polarized light beam are arranged along the x-axis, the first and second condenser mirror plates 301 and 302 may be disposed so that the secondary light source images formed by the z-polarized light beam and the secondary light source images formed by the x-polarized light beam are arranged along the z-axis, as in a polarizing illumination device 2 shown in FIG. 8. In this case, for example, the first condenser mirror plate 301 may be set in an inclined state so that it is rotated around the y-axis to form a predetermined angle with respect to the system optical axis L1 (the angle which the first condenser mirror plate 301 forms with the yz plane perpendicular to the system optical axis L1 is γ1), and the second condenser mirror plate 302 may be set in an inclined state so that it is rotated around the x-axis to form a predetermined angle with respect to the system optical axis L (the angle which the second condenser mirror plate 302 forms with the yz plane perpendicular to the system optical axis L is γ2), respectively (FIG. 8 shows these states). In the case of this embodiment, since the way of arrangement of the secondary light source images is changed as compared with the case of the prior first embodiment, it is necessary to appropriately change the way of arrangement of the condenser lens plate 411 and the λ/2 phase film 421 in the condenser lens section 401 so as to correspond to the way of arrangement. Specifically, it is necessary to arrange the phase layers 422 in the z-axis direction. In this case, since the basic principle of the polarizing illumination device is similar to that of the polarizing illumination device 1, a detailed description thereof will be omitted.

[Third Embodiment]

A polarization separating optical element 201 constructed without using a prism made of glass or resin can be adopted. In a polarizing illumination device 3 shown in FIG. 9 (showing a sectional view taken along the xy plane), the layout of optical systems is almost the same as that in the first embodiment. The polarizing illumination device 3 is, however, characterized in that a prism structure 251 is constructed by six transparent plates 252 forming wall surfaces, that a first polarization beam separation flat plate 253 having a first polarization separating film 211 formed thereon and a second polarization beam separation flat plate (This is not shown. Since the second polarization beam separation plate is separated by the first polarization beam separation plate 253, exactly, two polarization beam separation plates are needed.) having a second polarization separating film (not shown) formed thereon are disposed inside the prism structure 251, and that the structure filled with a liquid 254 is used as a polarization separating optical element 201. Here, it is necessary that the transparent plates, the first and second polarization beam separation plates, and the liquid have almost the same refractive index. This can reduce the cost and weight of the polarization separating optical element 201.

Furthermore, in the polarizing illumination device 3, microlenses constituting a condenser lens plate 411 of the condenser lens section 401 are formed of decentering lenses, as described in the first embodiment, whereby the condenser lens plate 411 also serves as the function of a superimposing lens, and the superimposing lens is omitted. This can reduce the cost and weight of the polarizing illumination device.

[Fourth Embodiment]

Figure 10:
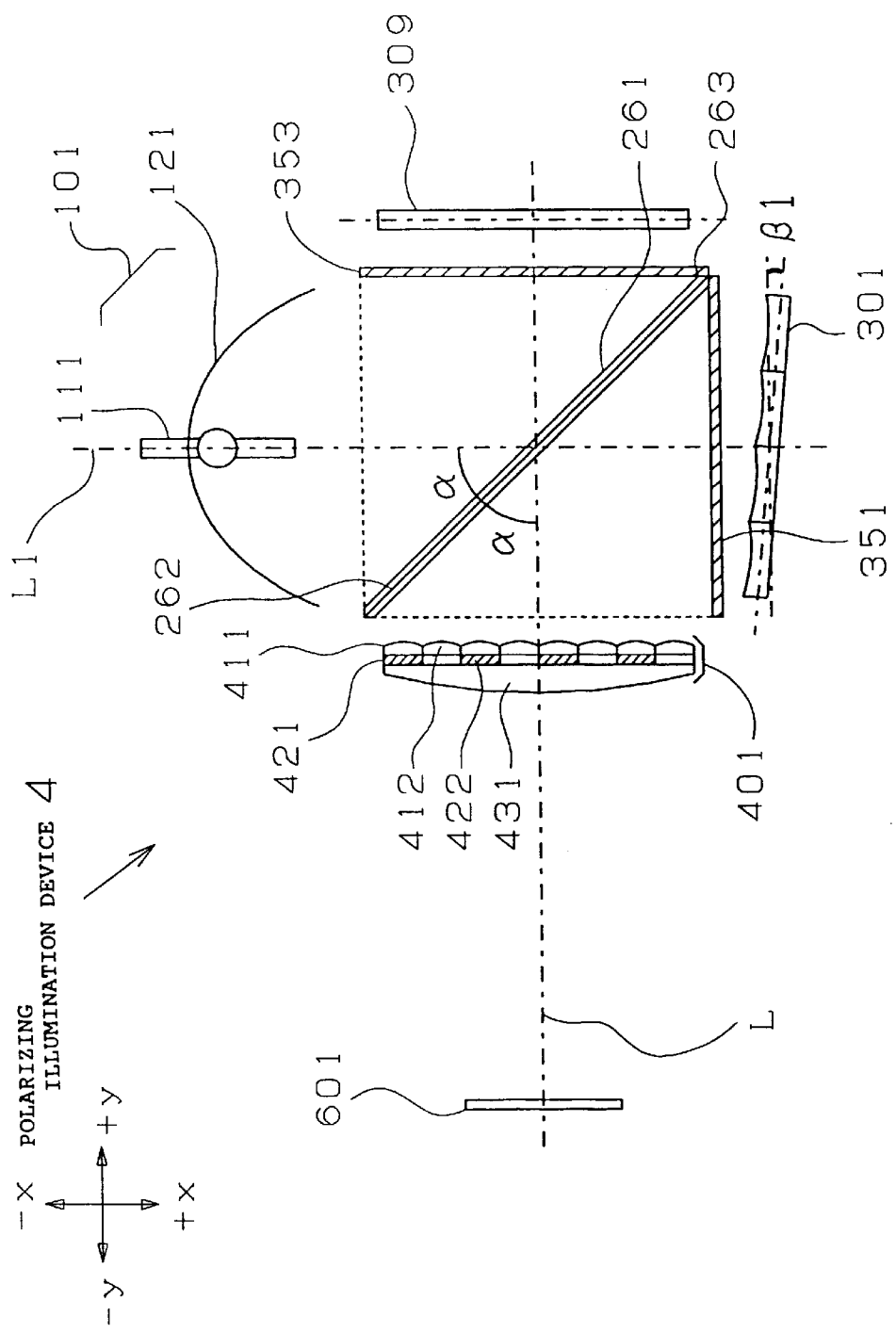
FIG. 10 schematically illustrates the basic construction of an optical system constructed in a polarizing illumination device according to a fourth embodiment of the present invention.

In a polarizing illumination device 4 shown in FIG. 10, the layout of optical system is the same as that in the first embodiment. The polarizing illumination device 4 is, however, characterized in that a polarization separating optical element 201 is formed of a flat structure. That is, two polarization beam separation plates 261 (since one of the polarization beam separation plates is separated by the other polarization beam separation plate, exactly, three polarization beam separation plates are provided) having a structure in which a polarization separating film 262 is sandwiched between two glass substrates 263, are disposed at an angle α of 45 degrees with respect to the system optical axis L (L1, L2), whereby they serve almost the same function as that of the polarization separating optical element 201 using a prism shaped like a hexahedron (see FIG. 1). This can reduce the cost and weight of the polarization separating optical element 201. Incidentally, in the polarization separating optical element 201 of this embodiment, the first to sixth surfaces as in the polarization separating optical elements 201 of the first to third embodiments do not exactly exist. However, it can be imagined that the polarization separating optical element 201 has first to sixth surfaces, as shown by dotted lines in the figure. Therefore, first and second light source sections 101 and 102, first to third λ/4 phase films 351, 352, and 353, first and second condenser mirror plates 301 and 302, a reflecting mirror element 309, a condenser lens section 401, and the like may be disposed with respect to these first to sixth imaginary surfaces, as in the first to third embodiments described above.

[Fifth Embodiment]

Figure 11:
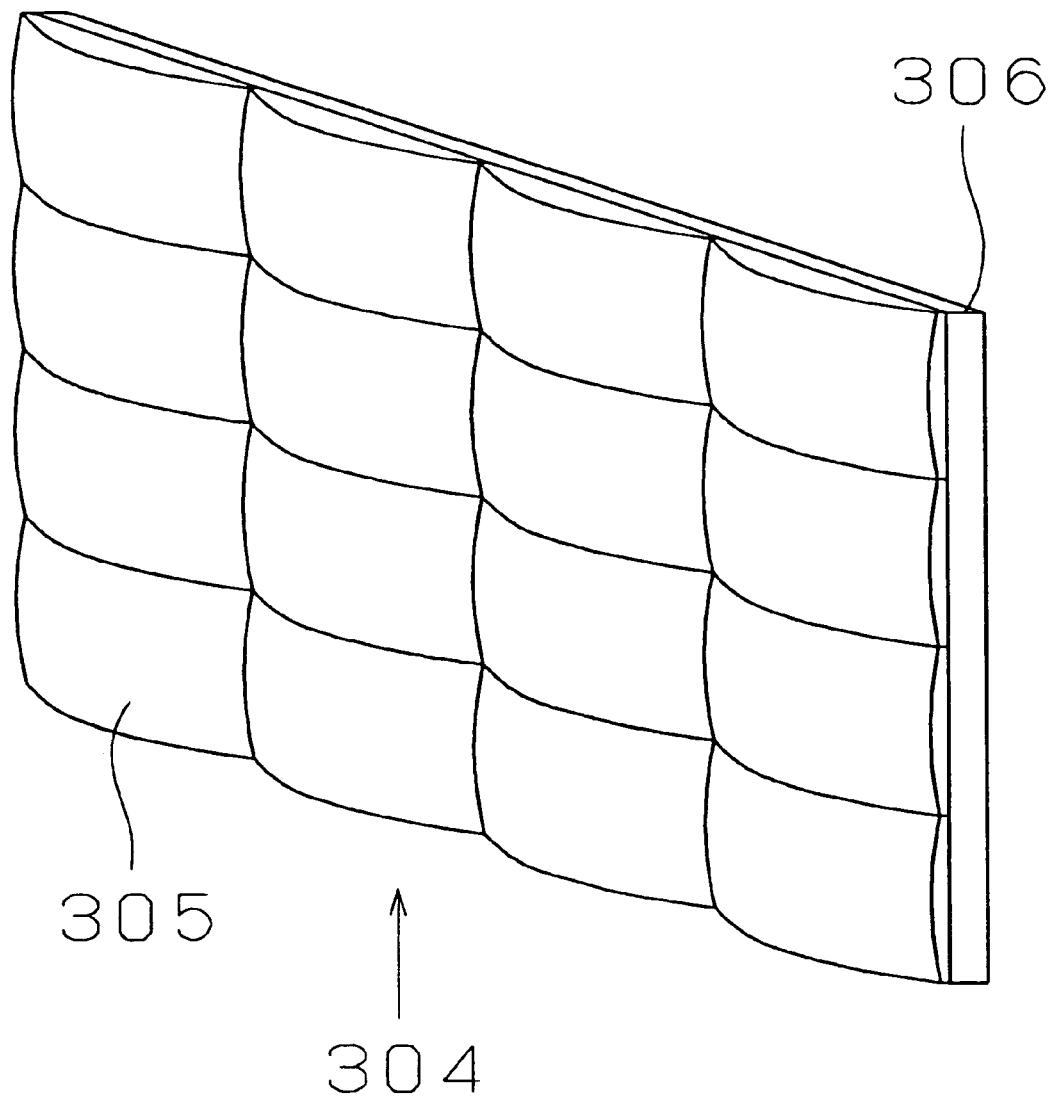
FIG. 11 is a perspective view of a condenser mirror plate according to a fifth embodiment, which is able to be used in the polarizing illumination devices of the first to fourth embodiments.

In the above-described polarizing illumination devices 1 to 4, some or all of the first and second condenser mirror plates 301 and 302 may be replaced with a condenser mirror plate 304 shown in FIG. 11. The condenser mirror plate 304 is composed of a plurality of microlenses 305, and a reflecting mirror plate 306.

Furthermore, when the plurality of microlenses 305 in this construction are formed of decentering lenses, light being emitted from the microlenses 305 can be directed toward the illumination area 601. Therefore, the first and second condenser mirror plates 301 and 302 can also serve as the function of the superimposing lens 431. In this case, since the superimposing lens 431 can be omitted, it is possible to reduce the cost of the polarizing illumination device.

[Sixth Embodiment]

Figure 12:
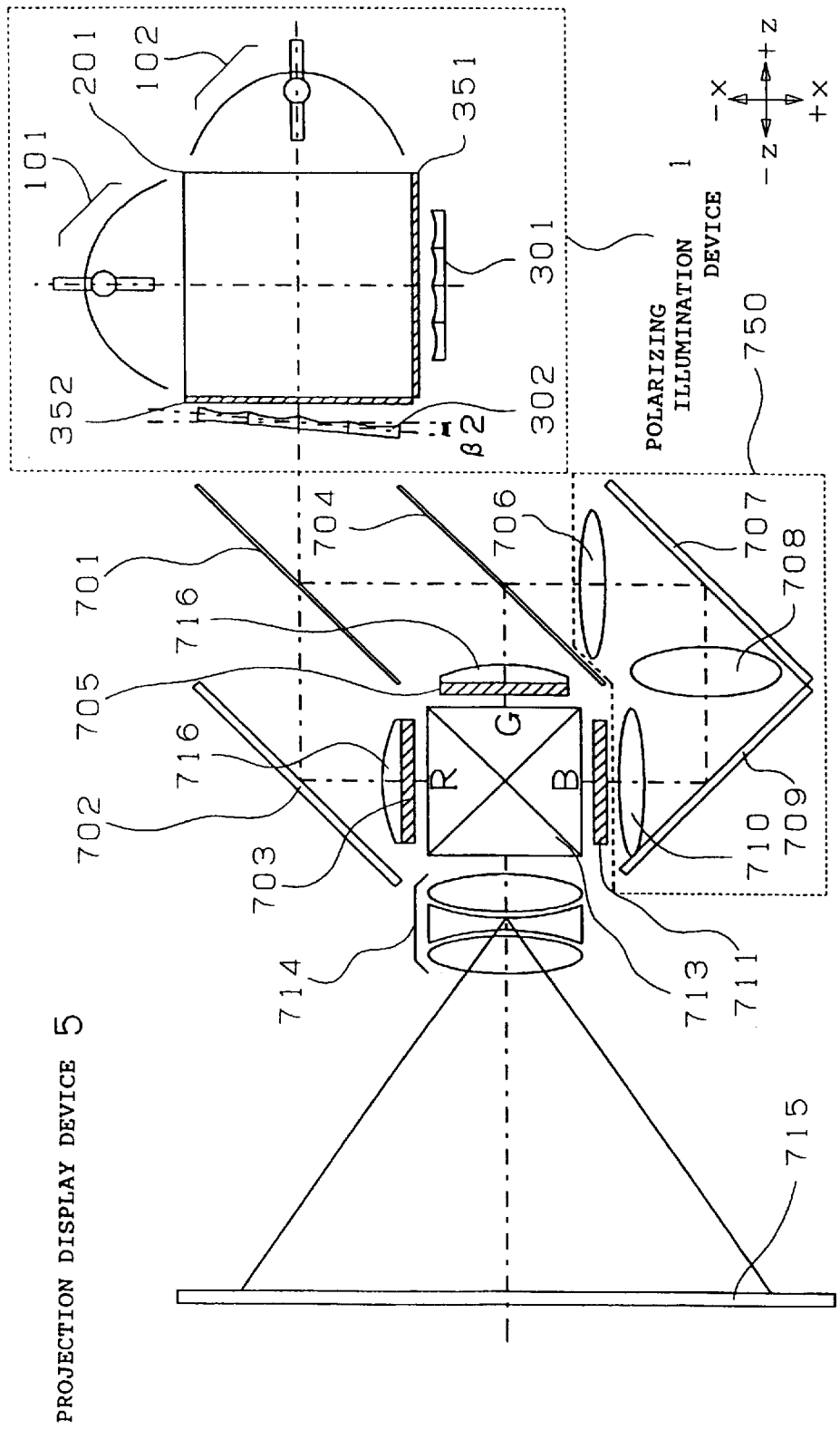
FIG. 12 schematically illustrates the construction in the xz plane of an optical system as an example of a projector including the polarizing illumination optical system shown in FIGS. 1 and 3.
Figure 13:
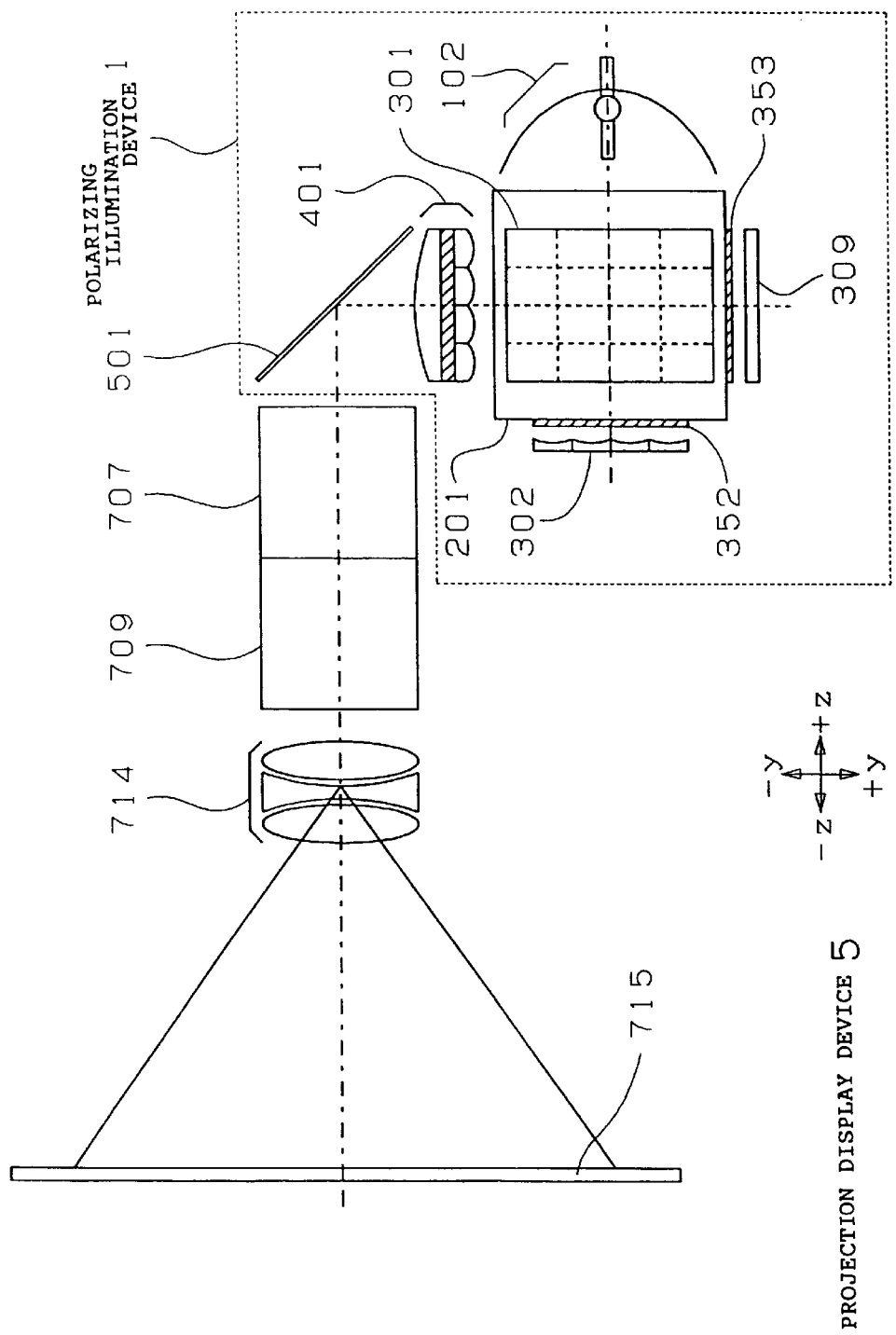
FIG. 13 schematically illustrates the construction in the yz plane of the optical system in the projector shown in FIGS. 1 and 3.

FIGS. 12 and 13 show an example of a projector that improves the brightness of a projection image by using the polarizing illumination device 1 of the first embodiment, of the polarizing illumination devices of the first to fifth embodiments. In a projector 5 of this embodiment, transmissive liquid crystal light valves are used as optical modulation devices, two types of light source lamps having different emission spectra are used as two light source sections in the polarizing illumination device 1, and the light source lamps can be selectively lit. FIG. 12 is a sectional view of the projector 5 taken along the xz plane, and FIG. 13 is a sectional view of the projector 5 taken along the yz plane. A condenser lens section 401, a fold-back reflecting mirror 501 serving as an optical-path-changing optical element, and the like are left out of FIG. 12.

Referring to FIGS. 12 and 13, the polarizing illumination device 1 incorporated in the projector 5 of this embodiment includes a first light source section 101 and a second light source section 102 for emitting randomly polarized light beam in one direction, and each of the randomly polarized light beams emitted from these light source sections is separated into two types of polarized light beams by a polarization separating optical element 201, and of the separated polarized light beams, the x-polarized light beam is converted into z-polarized light beam by the λ/2 phase film 421 of the condenser lens section 401 to be placed in almost one type of polarization state (z-polarized light beam), and is emitted from the condenser lens section 401. The z-polarized light beam emitted from the condenser lens section 401 is caused by the fold-back reflecting mirror 501 to change its direction of emission to the -z direction, and simultaneously, becomes a y-polarized light beam to enter a blue-and-green-reflecting dichroic mirror 701.

Red light of illumination light emitted from the polarizing illumination device 1 first passes through the blue-and-green-light-reflecting dichroic mirror 701 (color-light-separating optical element), and blue light and green light are reflected thereby. The red light is reflected by a reflecting mirror 702, and reaches a first liquid crystal light valve 703 via a collimator lens 716. Although polarizers are disposed on the incident and emitting sides of the liquid crystal light valve, they are not shown in FIG. 12. On the other hand, the green light of the blue light and green light is reflected by a green-light-reflecting dichroic mirror 704 (color-light-separating optical element), and reaches a second liquid crystal light valve 705 via a collimator lens 716. The collimator lenses 716 disposed on the incident sides of the first and second liquid crystal light valves 703 and 705 serve to improve the illumination efficiency by restraining light for illuminating the light valves from spreading, and to effectively guide light, which is emitted from the liquid crystal valves, to a projection lens that will be described later. On the incident side of a third liquid crystal light valve 711, an emitting-side lens 710 constituting a light guide means 750 is disposed, as will be described later, so as to serve the function of the collimator lenses 716. However, these collimator lenses can be omitted.

Here, since the blue light has a longer optical path than those of the other two color light, the light guide means 750, which is formed of a relay lens system including an incident-side lens 706, a relay lens 708, and the emitting-side lens 710, is provided for the blue light. That is, the blue light, after passing through the green-light-reflecting dichroic mirror 704, is first guided to the relay lens 708 via the incident-side lens 706 and a reflecting mirror 707. The blue light is collected by the relay lens 708, and is then guided to the emitting-side lens 710 by a reflecting mirror 709. Thereafter, the blue light reaches the third liquid crystal light valve 711.

The first to third liquid crystal light valves 703, 705 and 711 modulate each color light to contain corresponding image information, and then cause the modulated color light to enter a cross-dichroic prism 713 (color-light-synthesizing optical element). The cross-dichroic prism 713 has a construction in which a dielectric multilayer film for reflecting red light and a dielectric multilayer film for reflecting blue light are formed inside thereof in the shape of a cross, and synthesizes each of the modulated color light. The synthesized light passes through a projection lens 714 (projection optical system), and forms an image on a screen 715.

In the thus-constructed projector 5, liquid crystal light valves that modulate one type of polarized light beam are employed. Therefore, when a randomly polarized light beam is guided to the liquid crystal light valve using a conventional illumination device, more than half the randomly polarized light beam (about 60%) is absorbed by the polarizer and changed into heat, which lowers the light utilization efficiency, and a large and noisy cooling device is needed to restrict heat generation by the polarizer. In the projector 5 of this embodiment, such problems are substantially solved.

That is, in the projector 5 of this embodiment, only one polarized light beam (for example, an x-polarized light beam) is subjected to the rotation action in the direction of polarization by the λ/2 phase film 421 in the polarizing illumination device 1, thereby unifying the direction of polarization of the other polarized light beam (for example, a z-polarization light beam). For this reason, the polarized light beams polarized in the same direction are guided to the first to third liquid crystal light valves 703, 705, and 711, so that the light utilization efficiency is improved, and a bright projection image can be obtained. In addition, since the amount of light to be absorbed by the polarizer is reduced, an increase in temperature of the polarizer is limited. For this reason, a reduction in the size and noise of the cooling device can be realized. Furthermore, since two light source sections, the first and second light source sections 101 and 102, are provided and the directions of polarization of the light emitted from the light source sections are unified without any loss of light, a bright projection image can be obtained. Moreover, since dielectric multilayer films, which are thermally stable, are used as the polarization separating films in the polarizing illumination device 1, the polarization beam separating ability of the polarization separating optical element 201 is thermally stable. Consequently, a stable polarization beam separating ability can be always provided in the projector 5 that is needed to produce high light output.

Furthermore, although the two light source sections 101 and 102 are used, since illumination light therefrom can be synthesized without increasing the incident angle (illumination angle) of the illumination light with respect to the illumination area, the cross-sectional area of the illumination light is the same as that in the case in which a single light source section is used. Therefore, the amount of light per given illumination angle can be made double that in the case in which a single light source section is used. Consequently, a brighter projection image can be realized.

Furthermore, since two types of polarized light beams emitted from the polarization separating optical element 201 are separated in the lateral direction in accordance with the display area of the liquid crystal light valve, which is long from side to side and serves as an illumination area in the polarizing illumination device 1, it is possible to efficiently illuminate the illumination area having a rectangular shape that is long from side to side, without wasting the amount of light. For this reason, the polarizing illumination device 1 is suitable for a liquid crystal light valve, which is long from side to side, for projecting an image that is easy to see and powerful.

In addition, since the cross-dichroic prism 713 is used as the color-light-synthesizing optical element in this embodiment, size reduction is possible, and the length of the optical path between the liquid crystal light valves 703, 705, and 711 and the projection lens 714 can be shortened. Therefore, the projector 5 is characterized in that a bright projection image can be realized even when a projection lens having a relatively small aperture is used. In addition, the light guide means 750 consisting of a relay lens system including the incident-side lens 706, the relay lens 708, and the emitting-side lens 710 is provided for the blue light having the optical path longer than those of the red light and green light in this embodiment, so that inconsistencies in color and the like do not arise.

Furthermore, since the fold-back reflecting mirror 501 serving as the optical-path-changing optical element is disposed between the condenser lens section 401 serving as a polarization conversion optical element and the blue-and-green-light-reflecting dichroic mirror 701 in this embodiment, it is possible to change the direction of travel of a polarized light beam emitted from the polarization conversion optical element. This can arrange in parallel the plane on which the color-light-separating optical element, the color-light-synthesizing optical element, the optical modulation devices, and the projection optical system are arranged, and the plane including the polarizing illumination device 1 that has two light source sections with relatively large dimensions, and a low-profile projector having a reduced thickness in one direction can be realized.

In addition, in the polarizing illumination device 1 incorporated in the projector 5 of this embodiment, one of the first light source section 101 and the second light source section 102 may be detachable. According to this structure, for example, when the projector 5 is carried, one of the light source sections can be detached, thereby improving portability.

In the two light source sections 101 and 102 in the polarizing illumination device 1 incorporated in the projector 5 of this embodiment, two types of light source lamps having different emission spectra and different brightness characteristics are used, and these light source lamps can be selectively lit. The adoption of such a construction can provide the following advantages.

Figure 14:
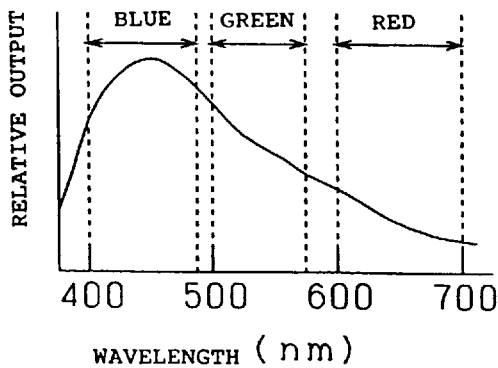
FIGS. 14(A)–14(C) include explanatory views showing emission spectra of light source lamp in the polarizing illumination device.
Figure 14:
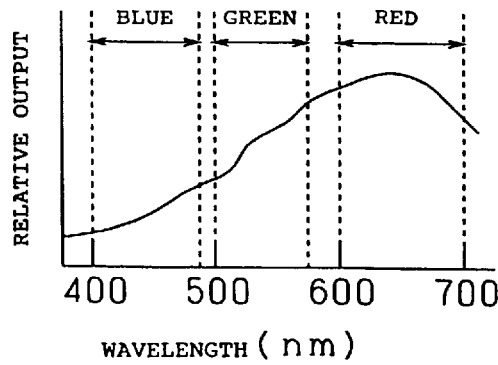
Figure 14:
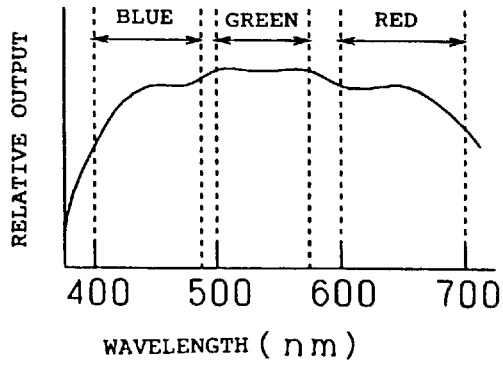

1) By using in combination two types of light source lamps having different emission spectra, an ideal illumination device, or an illumination device that is ideal for a projector can be realized. This point will be described by means of an example. For example, it is ideal that a light source lamp for use in a projector produces high light output in all the wavelength regions of blue light, green light, and red light, and the output is balanced in proportion. Under present conditions, however, such an ideal light source lamp is rare. FIGS. 14(A)–14(C) include explanatory views showing the spectra of light emitted from the light source lamp and the polarizing illumination device. In general, most existing light source lamps, for example, provide a relatively high emission efficiency and a relatively low intensity of red light (this case corresponds to a common high-pressure mercury-vapor lamp) as shown in (A), or provide a relatively high intensity of red light and a relatively low overall emission efficiency (this case corresponds to a certain kind of metal halide lamp) as shown in (B). Under such present conditions of light source lamps, when two types of light source lamps having the emission spectra shown in (A) and (B) are used and simultaneously lit in the polarizing illumination device 1 of the projector 5 of this embodiment, the spectra of light emitted from the polarizing illumination device 1 can be made ideal, as shown in (C), which makes it possible to easily realize a projector that is able to obtain a high-quality bright projection image.

2) By selectively lighting two types of light source lamps having different emission spectra, the hue of a projection image can be appropriately changed to suit the preferences of the viewer.

3) By selectively lighting the two types of light source lamps, the brightness of a projection image can be appropriately changed according to the environment where the projector is used, or according to the preferences of the viewer. For example, two light source sections are lit when a projection image is viewed in a light place, and only one of them is selectively lit when a projection image is viewed in a dark place.

4) When two light source lamps are selectively used, it is possible to extend the lives of the light source lamps themselves. Moreover, for example, even when one of the light source lamps is unable to be lit because of its end of life or failure, a projection image can remain displayed by using the other light source lamp, which improves operability. Furthermore, for example, when the projector 5 is driven by a battery, the longevity of the battery can be maintained by selectively lighting only one of the light source lamps.

Of course, the polarizing illumination devices 2 to 4 described above may be used instead of the polarizing illumination device 1.

[Seventh Embodiment]

The polarizing illumination device of the present invention can be applied to a projector that uses reflective liquid crystal light valves as optical modulation devices. Since the reflective liquid crystal light valves can ensure pixel opening ratio higher than that of the transmissive liquid crystal light valves, there is a possibility that a brighter projection image can be realized.

Figure 15:
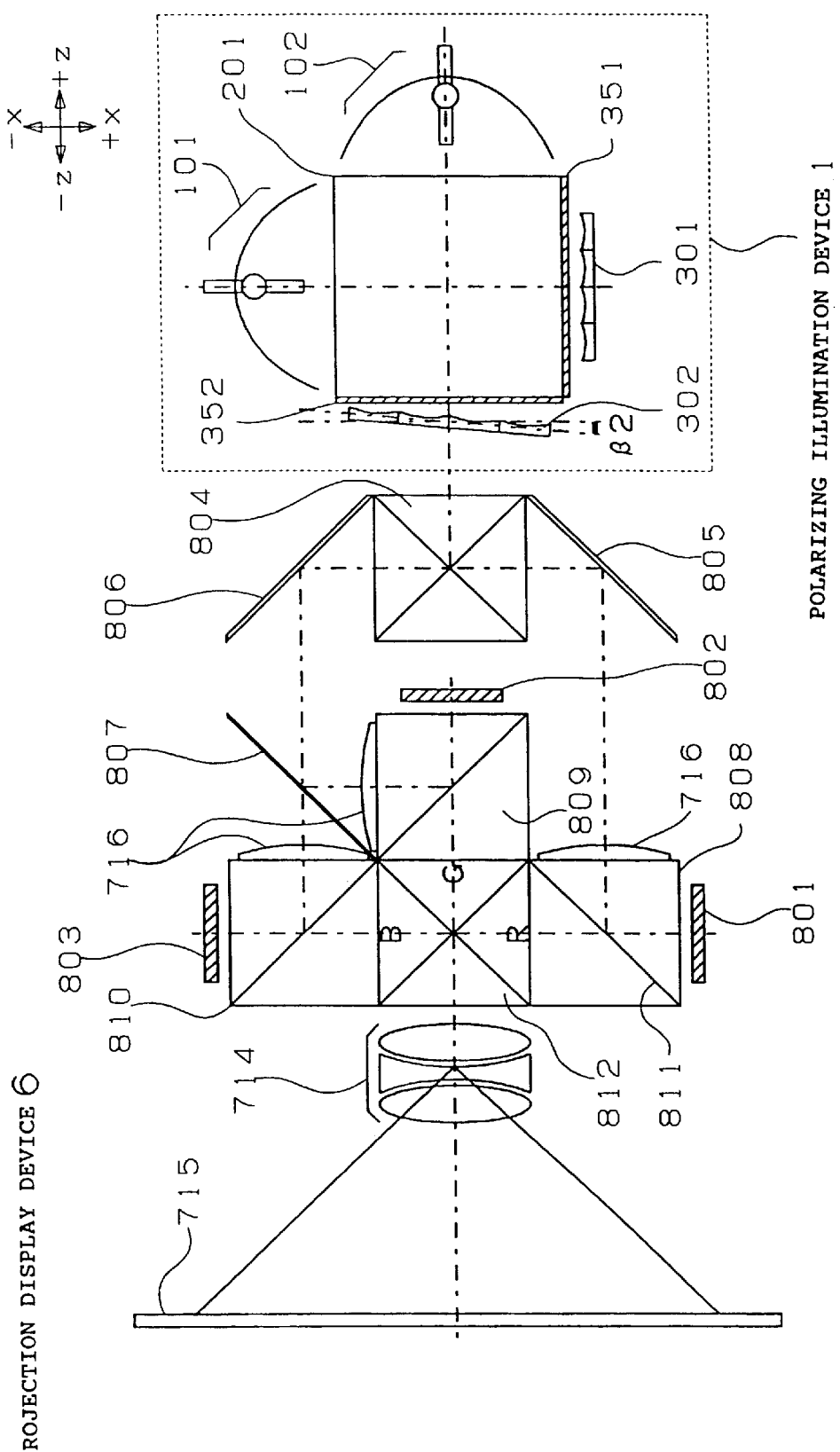
FIG. 15 schematically illustrates the construction in the xz plane of an optical system in another example of a projector including the polarizing illumination optical system shown in FIGS. 1 and 3.

That is, in a projector 6 shown in FIG. 15 (a sectional view taken along the xz plane of the projector), the polarizing illumination device 1 of the first embodiment is used, and each of randomly polarized light beams emitted from first and second light source sections 101 and 102 is separated into two types of polarized light beams by a polarization separating optical element 201, and then directions of polarization are unified and emitted from a condenser lens section (not shown). An illumination luminous flux united into the z-polarized light beam by the condenser lens section (not shown) is caused by an optical-path-changing optical element (not shown) to bend its optical path through an angle of about 90 degrees, and becomes y-polarized light beam to illuminate reflective liquid crystal light valves 801, 802, and 803 disposed at three positions.

Light emitted from such a polarizing illumination device 1 (although a condenser lens section, a fold-back reflecting mirror serving as an optical-path-changing optical element and the like are also provided in this embodiment, similar to the previous projector 5, they are omitted) is first separated into red light, blue light, and a green light by a color-light-separating cross-dichroic prism 804 (color-light-separating optical element) in which a dielectric multilayer film for reflecting blue-and-green light and a dielectric multilayer film for reflecting red light are formed in the shape of a cross. The red light enters a first polarizing beam splitter 808 via a reflecting mirror 805 and a collimator lens 716. On the other hand, the blue light and the green light are reflected by a reflecting mirror 806, and are then separated into green light (reflected light) and blue light (transmitted light) by a green-light-reflecting dichroic mirror 807 (color-light-separating optical element). Each of the color light enters the corresponding second and third polarizing beam splitter 809 and 810 via the collimator lenses 716, respectively. The polarizing beam splitters 808, 809, and 810 (polarization separating optical elements) at three positions are optical elements that include a polarization beam separation surface 811 inside thereof, and that have a polarization beam separating function of separating p-polarized light beam and s-polarized light beam by transmitting p-polarized light beam of incident light and reflecting s-polarized light beam. In FIG. 15, most light emitted from the polarizing illumination device 1 is y-polarized light beam having a polarization axis in the y-axis direction. The y-polarized light beam corresponds to the above-described s-polarized light beam with respect to polarization beam separation surfaces 811 of the first to third polarizing beam splitters 808, 809, and 810.

On the other hand, the p-polarized light beam is a polarized light beam having a polarization axis in the x-axis or the z-axis direction.

Since most of light emitted from the polarizing illumination device 1 is s-polarized light beam, most of each color light, which is incident on the first to third polarizing beam splitters 808, 809, and 810, is reflected by the polarization beam separation surface 811 so that the direction of travel thereof is changed through about 90 degrees, and enters the adjoining first to third reflective liquid crystal light valves 801, 802, and 803. In some cases, however, a small amount of polarized light beams that are polarized in a direction different from that of the s-polarized light beam (for example, p-polarized light beams) are mixed in each color light that is incident on the first to third polarizing beam splitters 808, 809, 810. Since such polarized light beams polarized in the different directions pass unchanged through the polarization beam separation surface 811 and are emitted without changing their directions of travel inside the polarizing beam splitters, they do not serve as light for illuminating the reflective liquid crystal light valves. The function of the collimator lenses 716 disposed on the incident sides is the same as that of the collimator lenses 716 used in the projector 5 described in the sixth embodiment. Therefore, collimator lenses may be disposed between the polarizing beam splitters and the reflective liquid crystal light valves as distinct from this embodiment. In addition, it is possible to omit these collimator lenses.

Light that is incident on the reflective liquid crystal light valves (s-polarized light beam, i.e., y-polarized light beam) is subjected to optical modulation by the respective liquid crystal light valves according to image information from the outside. Specifically, the direction of polarization of the light to be emitted from each of the reflective liquid crystal light valves is changed according to display information, and the direction of travel of the light is approximately reversed, and the light is emitted from each of the reflective liquid crystal light valves. The light emitted from the reflective liquid crystal light valve enters again the polarizing beam splitter. In this case, since the emitted light from each of the reflective liquid crystal light valves is partially converted into p-polarized light beam according to the display information, only the p-polarization light beam is permitted by a polarization beam separating function to pass through the polarizing beam splitter (in this stage, a display image is formed), and reaches a color-light-synthesizing cross-dichroic prism 812. Each color light that is incident on the color-light-synthesizing cross-dichroic prism 812 (color-light-synthesizing optical element) is synthesized into one optical image, and projected as a color image onto a screen 715 by the projection lens 714 (projection optical system).

In this way, since reflective liquid crystal light valves of a type that modulate one type of polarized light beam are used in the projector 6 composed of reflective liquid crystal light valves, if a randomly polarized light beam is guided to the reflective liquid crystal light valves by using a conventional illumination device, more than half the randomly polarized light beam (about 60%) is absorbed by the polarizer, and changed into heat. Therefore, although the conventional illumination device has a problem in that the light utilization efficiency is low, and a large and noisy cooling device for restricting the heat generation of the polarizer is required, such a problem is substantially solved by the projector 6 of this embodiment.

That is, in the projector 6 of this embodiment, only one of the polarized light beams (for example, x-polarized light beam) is subjected to rotation action in the direction of polarization by a λ/2 phase film (not shown) in the polarization illumination device 1 so that the direction of polarization thereof and the direction of polarization of the other polarized light beam (for example, z-polarized light beam) are unified. Therefore, since the polarized light beams polarized in the same direction are guided to the first to third reflective liquid crystal light valves 801, 802, and 803, the light utilization efficiency is improved, and a bright projection image can be obtained. In addition, since the amount of light to be absorbed by the polarizer is decreased, the increase in temperature of the polarizer is limited. For this reason, the reduction in size and noise of the cooling device can be realized. Furthermore, since two light source sections, the first and second light source sections 101 and 102 are included, and the directions of polarization of emitted light from the light source sections are unified without any loss, a bright projection image can be obtained. Moreover, since the polarizing illumination device 1 uses thermally stable dielectric multilayer films as polarization separating films, the polarization beam separating ability of the polarization separating optical element 201 is thermally stable. For this reason, the projector 6, which needs to a high light output, can always show a stable polarization beam separating ability.

Furthermore, although two light source sections 101 and 102 are used, since illumination light from the two light source sections 101 and 102 can be synthesized without increasing the incident angle (illumination angle) of the illumination light with respect to the illumination area, the cross-sectional area of the illumination light is the same as that in the case where a single light source section is used, and therefore, the amount of light per given illumination angle can be made about double that in the case where a single light source section is used. Therefore, a brighter projection image can be realized. In particular, since the polarization beam separating characteristics of polarizing beam splitters, which are commonly used in reflective optical systems, greatly depend on the angle of the incident light, the feature of the present invention such that the amount of luminous fluxes can be increased about two times without increasing the illumination angle is extremely useful for a projector using reflective light valves in that a bright projection image can be realized without decreasing contrast.

In addition, since a fold-back reflecting mirror (not shown) serving as an optical-path-changing optical element is disposed between a condenser lens section (not shown) serving as a polarization conversion optical element and the color-light-separating cross-dichroic prism 804 also in the projector 6 of this embodiment, it is possible to realize a low-profile projection display device that has a reduced thickness in one direction, as described in the sixth embodiment.

Furthermore, in the projector 6 of this embodiment, it is also possible to detachably mount one of the first and second light source sections 101 and 102, to use two types of light source lamps having different emission spectra and different brightness characteristics in the first and second light source sections 101 and 102, or to selectively light the two light source lamps, whereby the above-described advantages can be obtained.

Incidentally, polarizers may be disposed on the incident sides of the respective polarizing beam splitters 808, 809, and 810, and on the emitting sides of the respective polarizing beam splitters 808, 809, and 810 or on the emitting side of the color-light-synthesizing cross-dichroic prism. In this case, there is a possibility that the contrast ratio of a display image can be improved.

In addition to the projector of this embodiment using the reflective light valves, a projector has been known which is composed of one polarizing beam splitter and one color-separating-and-synthesizing prism. While a polarizing beam splitter for broadband is required in such a projector, polarization beam separating characteristics of such a polarizing beam splitter remarkably depend on the angle of the incident light. Therefore, the feature of the present invention such that the illumination angle is not increased despite the use of two light source sections is suitable for projectors of this type.

Incidentally, it is a matter of course that the above-described polarizing illumination devices 2 to 4 may be used instead of the polarizing illumination device 1.

[Other Embodiments]

While the x-polarized light beam is converted into the z-polarized light beam by the condenser lens section 401 and the light polarized in the z direction is used as illumination light in the above-described embodiments, conversely, the z-polarized light beam may be converted into the x-polarized light beam, and the light polarized in the x-direction may be used as illumination light. In this case, the phase layers 422 of the λ/2 phase film 421 may be disposed at the positions where secondary light source images of the z-polarized light beam are formed. In addition, the directions of polarization may be unified by subjecting the z-polarized light beam and the x-polarized light beam to the rotation action in the directions of polarization. In this case, the phase layers may be disposed at the positions where the secondary light source images are formed by both the polarization light beams.

Furthermore, the λ/2 phase film and the λ/4 phase film may be formed of liquid crystal (for example, twisted nematic liquid crystal). In this case, there is a possibility that the wavelength dependency of the phase films can be reduced, and the polarization conversion ability of the λ/2 phase film and the λ/4 phase film can be improved.

The polarizing illumination devices of the above-described embodiments are extremely effective for a projector including optical modulation devices (light valves) that utilize a specific polarized light beam, such as liquid crystal light valves. This type of projector has various modes, and the construction of the present invention can be adopted to a projector in any one of the modes.

What is claimed is:

1. A polarizing illumination device comprising:
    a polarization separating optical element having a first polarization separating film that separates light incident from a first direction into two types of polarized light beams, emits transmitted light in a third direction, and emits reflected light in a fourth direction, and a second polarization separation film that separates light incident from a second direction into two types of polarized light beams, emits reflected light in the fourth direction, and emits transmitted light in a fifth direction;
    a first light source section that allows light to enter the polarization separating optical element from the first direction;
    a second light source section that allows light to enter the polarization separating optical element from the second direction;
    a first condensing-and-reflecting optical element including a plurality of condensing-and-reflecting devices that approximately reverses the direction of travel of the light emitted in the third direction by the polarization separating optical element and forming a plurality of focal images;

a second condensing-and-reflecting optical element including a plurality of condensing-and-reflecting devices that approximately reverses the direction of travel of the light emitted in the fifth direction by the polarization separating optical element and forming a plurality of focal images;

a reflecting optical element for approximately reverses the direction of travel of the light emitted in the fourth direction by the polarization separating optical element;

a first polarization-state conversion optical element disposed between the polarization separating optical element and the first condensing-and-reflecting optical element;

a second polarization-state conversion optical element disposed between the polarization separating optical element and the second condensing-and-reflecting optical element;

a third polarization-state conversion optical element disposed between the polarization separating optical element and the reflecting optical element; and a polarization conversion optical element that unifies the direction of polarization of the light emitted in a sixth direction from the polarization separating optical element, an approximately central axis of a luminous flux, which is reflected by the condensing-and-reflecting devices of the first condensing-and-reflecting optical element and enters the polarization conversion optical element, and an approximately central axis of a luminous flux, which is reflected by the condensing-and-reflecting devices of the second condensing-and-reflecting optical element and enters the polarization conversion optical element, not being parallel to each other and not overlapping each other.

2. The polarizing illumination device according to claim 1, an opening shape of each of the condensing-and-reflecting devices being similar to the shape of an illumination area.

3. The polarizing illumination device according to claim 1, a condensing optical element including a plurality of condensing devices being disposed on the side of an incident surface or on the side of an emitting surface of the polarization conversion optical element.

4. The polarizing illumination device according to claim 1, a superimposing optical element for superimposing light emitted from the polarization conversion optical element on the illumination area being disposed on the side of the emitting surface of the polarization conversion optical element.

5. The polarizing illumination device according to claim 1, an optical-path-changing optical element for changing an optical path of light emitted from the polarization conversion optical element being disposed on the side of the emitting surface of the polarization conversion optical element.

6. The polarizing illumination device according to claim 1, each of the condensing-and-reflecting devices of the first and second condensing-and-reflecting optical elements being formed of curved-surface reflecting mirror.

7. The polarizing illumination device according to claim 1, each of the condensing-and-reflecting devices of the first and second condensing-and-reflecting optical elements comprising a lens, and a reflecting surface provided on a surface of the lens opposite to the polarization separating optical element.

8. A polarizing illumination device comprising:

a polarization separating optical element having a first polarization separating film that separates light incident from a first direction into two types of polarized light beams, emits transmitted light in a third direction, and emits reflected light in a fourth direction, and a second polarization separation film that separates light incident from a second direction into two types of polarized light beams, emits reflected light in the fourth direction, and emits transmitted light in a fifth direction;

a first light source section that allows light to enter the polarization separating optical element from the first direction;

a second light source section that allows light to enter the polarization separating optical element from the second direction;

a first condensing-and-reflecting optical element including a plurality of condensing-and-reflecting devices that approximately reverses the direction of travel of the light emitted in the third direction by the polarization separating optical element and forming a plurality of focal images;

a second condensing-and-reflecting optical element including a plurality of condensing-and-reflecting devices that approximately reverses the direction of travel of the light emitted in the fifth direction by the polarization separating optical element and forming a plurality of focal images;

a reflecting optical element that approximately reverses the direction of travel of the light emitted in the fourth direction by the polarization separating optical element;

a first polarization-state conversion optical element disposed between the polarization separating optical element and the first condensing-and-reflecting optical element;

a second polarization-state conversion optical element disposed between the polarization separating optical element and the second condensing-and-reflecting optical element;

a third polarization-state conversion optical element disposed between the polarization separating optical element and the reflecting optical element; and a polarization conversion optical element that unifies the direction of polarization of the light emitted in a sixth direction from the polarization separating optical element, an approximately central axis of a luminous flux, which is reflected by the condensing-and-reflecting devices of the first condensing-and-reflecting optical element and enters the polarization conversion optical element, and an approximately central axis of a luminous flux, which is reflected by the condensing-and-reflecting devices of the second condensing-and-reflecting optical element and enters the polarization conversion optical element, not being parallel to each other and not overlapping each other, the reflecting optical element being disposed so that the polarized light beam emitted from the first light source section and reflected by the first polarization separating film, and the polarized light beam emitted from the second light source section and reflected by the second polarization separating film, enter the second and first light source sections that are different from those at the time of emission.

9. The polarizing illumination device according to claim 8, an opening shape of each of the condensing-and-reflecting devices being similar to the shape of an illumination area.

10. The polarizing illumination device according to claim 8, a condensing optical element including a plurality of condensing devices being disposed on the side of an incident surface or on the side of an emitting surface of the polarization conversion optical element, in order to condense light emitted from the polarization separating optical element.

11. The polarizing illumination device according to claim 8, a superimposing optical element for superimposing light emitted from the polarization conversion optical element on the illumination area being disposed on the side of the emitting surface of the polarization conversion optical element.

12. The polarizing illumination device according to claim 8, an optical-path-changing optical element for changing an optical path of light emitted from the polarization conversion optical element being disposed on the side of the emitting surface of the polarization conversion optical element.

13. The polarizing illumination device according to claim 8, each of the condensing-and-reflecting devices of the first and second condensing-and-reflecting optical elements being formed of curved-surface reflecting mirror.

14. The polarizing illumination device according to claim 8, each of the condensing-and-reflecting devices of the first and second condensing-and-reflecting optical elements comprising a lens, and a reflecting surface provided on a surface of the lens opposite to the polarization separating optical element.

15. A projector comprising:
the polarizing illumination device of claim 1;
an optical modulation device that modulates light emitted from the polarizing illumination device; and
a projection optical system that projects the light modulated by the optical modulation device.

16. A projector comprising;
the polarizing illumination device of claim 1;
a color-light-separating optical element that separates light emitted from the polarizing illumination device into a plurality of color light;
a plurality of optical modulation devices that modulate each of the color light separated by the color-light-separating optical element;
a color-light-synthesizing optical element that synthesizes the light modulated by the plurality of optical modulation devices; and
a projection optical system that projects the light synthesized by the color-light-synthesizing optical element.

17. A projector comprising:
the polarizing illumination device of claim 1;
a reflective optical modulation device that modulates light emitted from the polarizing illumination device;
a polarization separating optical element that separates a plurality of polarized light components included in the light emitted from the polarizing illumination device and the light modulated by the reflective optical modulation device; and
a projection optical system that projects the light modulated by the reflective optical modulation device and emitted via the polarization separating optical element.

18. A projector comprising:
the polarizing illumination device of claim 1;
a plurality of reflective optical modulation devices that modulates light emitted from the polarizing illumination device;
a polarization separating optical element that separates a plurality of polarized light components included in the light emitted from the polarizing illumination device and the light modulated by the plurality of reflective optical modulation devices;
a color-light-separating-and-synthesizing optical element disposed between the polarization separating optical element and the plurality of reflective optical modulation devices, that separates light emitted from the polarizing illumination device into a plurality of color light and synthesizes the color light emitted from the plurality of reflective optical modulation devices; and
a projection optical system that projects the light modulated by the reflective optical modulation devices and emitted via the color-light-separating-and-synthesizing optical element and the polarization separating optical element.

19. A projector comprising:
the polarizing illumination device claim 1;
a color-light-separating optical element that separates light emitted from the polarizing illumination device into a plurality of color light;
a plurality of reflective optical modulation devices that modulates each of color light separated by the color-light-separating optical element;
a plurality of polarization separating optical elements that separates a plurality of polarized light components included in each of the color light separated by the color-light-separating optical element and in each of the color light modulated by the reflective optical modulation devices;
a color-light-synthesizing optical element that synthesizes the light modulated by each of the reflective optical modulation devices and emitted via each of the polarization separating optical element; and
a projection optical system that projects the light synthesized by the color-light-synthesizing optical element.

20. The projector according to claim 16, at least one of the first and second light source sections being detachable.

21. The projector according to claim 16, at least one of the first and second light source sections being selectively lit.

22. The projector according to claim 15, at least one of the first and second light source sections being detachable.

23. The projector according to claim 15, at least one of the first and second light source sections being selectively lit.

24. The projector according to claim 17, at least one of the first and second light source sections being detachable.

25. The projector according to claim 17, at least one of the first and second light source sections being selectively lit.

26. The projector according to claim 18, at least one of the first and second light source sections being detachable.

27. The projector according to claim 18, at least one of the first and second light source sections being selectively lit.

28. The projector according to claim 19, at least one of the first and second light source sections being detachable.

29. The projector according to claim 19, at least one of the first and second light source sections being selectively lit.

30. A projector comprising:
the polarizing illumination device of claim 8;
an optical modulation device that modulates light emitted from the polarizing illumination device; and
a projection optical system that projects the light modulated by the optical modulation device.

31. The projector according to claim 30, at least one of the first and second light source sections being detachable.

32. The projector according to claim 30, at least one of the first and second light source sections being selectively lit.

33. A projector comprising;

the polarizing illumination device of claim 8;

a color-light-separating optical element that separates light emitted from the polarizing illumination device into a plurality of color light;

a plurality of optical modulation devices that modulate each of the color light separated by the color-light-separating optical element;

a color-light-synthesizing optical element that synthesizes the light modulated by the plurality of optical modulation devices; and a projection optical system that projects the light synthesized by the color-light-synthesizing optical element.

34. The projector according to claim 33, at least one of the first and second light source sections being detachable.

35. The projector according to claim 33, at least one of the first and second light source sections being selectively lit.

36. A projector comprising:

the polarizing illumination device of claim 8;

a reflective optical modulation device that modulates light emitted from the polarizing illumination device;

a polarization separating optical element that separates a plurality of polarized light components included in the light emitted from the polarizing illumination device and the light modulated by the reflective optical modulation device; and a projection optical system that projects the light modulated by the reflective optical modulation device and emitted via the polarization separating optical element.

37. The projector according to claim 36, at least one of the first and second light source sections being detachable.

38. The projector according to claim 36, at least one of the first and second light source sections being selectively lit.

39. A projector comprising:

the polarizing illumination device of claim 8;

a plurality of reflective optical modulation devices that modulates light emitted from the polarizing illumination device;

a polarization separating optical element that separates a plurality of polarized light components included in the light emitted from the polarizing illumination device and the light modulated by the plurality of reflective optical modulation devices;

a color-light-separating-and-synthesizing optical element disposed between the polarization separating optical element and the plurality of reflective optical modulation devices, that separates light emitted from the polarizing illumination device into a plurality of color light and synthesizes the color light emitted from the plurality of reflective optical modulation devices; and a projection optical system that projects the light modulated by the reflective optical modulation devices and emitted via the color-light-separating-and-synthesizing optical element and the polarization separating optical element.

40. The projector according to claim 39, at least one of the first and second light source sections being detachable.

41. The projector according to claim 39, at least one of the first and second light source sections being selectively lit.

42. A projector comprising:

the polarizing illumination device claim 8;

a color-light-separating optical element that separates light emitted from the polarizing illumination device into a plurality of color light;

a plurality of reflective optical modulation devices that modulates each of color light separated by the color-light-separating optical element;

a plurality of polarization separating optical elements that separates a plurality of polarized light components included in each of the color light separated by the color-light-separating optical element and in each of the color light modulated by the reflective optical modulation devices;

a color-light-synthesizing optical element that synthesizes the light modulated by each of the reflective optical modulation devices and emitted via each of the polarization separating optical element; and a projection optical system that projects the light synthesized by the color-light-synthesizing optical element.

43. The projector according to claim 42, at least one of the first and second light source sections being detachable.

44. The projector according to claim 42, at least one of the first and second light source sections being selectively lit.

* * * * *